US009893552B2

(12) United States Patent
Jeon et al.

(10) Patent No.: US 9,893,552 B2
(45) Date of Patent: Feb. 13, 2018

(54) CHARGING CIRCUITS, CHARGING SYSTEMS, AND WIRELESS POWER RECEPTION DEVICES INCLUDING THE SAME

(71) Applicants: Byung-Chul Jeon, Seongnam-si (KR); Jin-Sub Choi, Yongin-si (KR); Jong-Sung Hong, Seoul (KR)

(72) Inventors: Byung-Chul Jeon, Seongnam-si (KR); Jin-Sub Choi, Yongin-si (KR); Jong-Sung Hong, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 409 days.

(21) Appl. No.: 14/562,116

(22) Filed: Dec. 5, 2014

(65) Prior Publication Data
US 2015/0180249 A1    Jun. 25, 2015

(30) Foreign Application Priority Data
Dec. 19, 2013 (KR) ........................ 10-2013-0159136

(51) Int. Cl.
*H02J 7/00*    (2006.01)
*H01M 10/00*    (2006.01)
(Continued)

(52) U.S. Cl.
CPC ............. *H02J 7/025* (2013.01); *H02J 5/005* (2013.01); *H02J 7/0045* (2013.01);
(Continued)

(58) Field of Classification Search
CPC .. H01M 1042/42; H01M 16/00; H02J 7/0054; H02J 7/025; H02J 5/005; H02J 7/0045; H02J 7/0047
(Continued)

(56) References Cited

U.S. PATENT DOCUMENTS 5,329,219 A    7/1994   Garrett
5,670,862 A    9/1997   Lewyn
(Continued)

FOREIGN PATENT DOCUMENTS

KR    20080036412 A    4/2008
KR    101065591 B1    9/2011
KR    20120120889 A    11/2012

*Primary Examiner* — Stacy Whitmore
(74) *Attorney, Agent, or Firm* — Harness, Dickey & Pierce, P.L.C.

(57) ABSTRACT

A charging circuit may include a battery unit in which a rechargeable battery is mounted; a charging unit configured to provide a charging current to the rechargeable battery in the battery unit, based on a direct current (DC) voltage converted from an alternating current (AC) voltage, and configured to charge the rechargeable battery; and/or a controller configured to control the charging unit such that the charging unit provides the rechargeable battery with a first charging current following a first current profile in a first charging mode as the charging current at least in a first period of the first charging mode, based on the charging current, a battery voltage of the rechargeable battery, and a temperature of the rechargeable battery, wherein the first current profile is smaller than an available maximum current in the first period.

20 Claims, 22 Drawing Sheets

(51) Int. Cl.
*H02J 7/02* (2016.01)
*H02J 5/00* (2016.01)
*H01M 10/42* (2006.01)
*H01M 6/00* (2006.01)

(52) U.S. Cl.
CPC ............ *H02J 7/0047* (2013.01); *H01M 6/00* (2013.01); *H01M 10/42* (2013.01); *H02J 7/0054* (2013.01); *H02J 7/0063* (2013.01); *H02J 7/0068* (2013.01)

(58) Field of Classification Search
USPC ........................................................ 320/108
See application file for complete search history.

(56) References Cited

U.S. PATENT DOCUMENTS

| | | | |
|---|---|---|---|
| 7,528,574 B1 | 5/2009 | Adkins et al. | |
| 7,834,591 B2 | 11/2010 | Hussain et al. | |
| 7,863,865 B2 | 1/2011 | Hussain et al. | |
| 7,880,445 B2 | 2/2011 | Hussain et al. | |
| 7,990,106 B2 | 8/2011 | Hussain et al. | |
| 8,138,721 B2 | 3/2012 | Yang et al. | |
| 8,193,780 B2 | 6/2012 | Hussain et al. | |
| 8,217,628 B2 | 7/2012 | Yang et al. | |
| 8,368,357 B2 | 2/2013 | Ghantous et al. | |
| 8,552,693 B2* | 10/2013 | Paryani | H02J 7/047 320/104 |
| 2010/0315037 A1* | 12/2010 | Aiura | H02J 7/0047 320/107 |
| 2012/0091946 A1 | 4/2012 | Miyazawa et al. | |
| 2012/0200264 A1 | 8/2012 | Choi et al. | |
| 2012/0206111 A1 | 8/2012 | Park | |
| 2012/0310568 A1 | 12/2012 | Wang et al. | |
| 2013/0069584 A1 | 3/2013 | Nagakura | |
| 2013/0134908 A1* | 5/2013 | Sugiyama | B60L 11/14 318/3 |
| 2013/0249468 A1* | 9/2013 | Bajjuri | F02N 11/0825 320/104 |
| 2014/0002031 A1* | 1/2014 | Chaturvedi | H01M 10/44 320/152 |
| 2014/0009123 A1 | 1/2014 | Park et al. | |

* cited by examiner

| 351 | 352 | 353 |
|---|---|---|
| CSN, THM | SOC | Imav |
| CSN1, THM1 | SOC1 | Imav1 |
| CSN2, THM2 | SOC2 | Imav2 |
| ⋮ | ⋮ | ⋮ |
| CSNn, THMn | SOCn | Imavn |

CHARGING CIRCUITS, CHARGING SYSTEMS, AND WIRELESS POWER RECEPTION DEVICES INCLUDING THE SAME

CROSS-REFERENCE TO RELATED APPLICATION(S)

This application claims priority from Korean Patent Application No. 10-2013-0159136, filed on Dec. 19, 2013, in the Korean Intellectual Property Office (KIPO), the entire contents of which are incorporated herein by reference.

BACKGROUND

1. Field

Some example embodiments may relate generally to charging technology. Some example embodiments may relate to charging circuits. Some example embodiments may relate to charging systems. Some example embodiments may relate to wireless reception devices including the charging circuits and/or the charging systems.

2. Description of Related Art

Mobile apparatuses that enable portability such as a mobile phone may receive power through a battery. At this point, a rechargeable battery may generally be used. A user should recharge the battery before the battery is discharged completely. To charge the battery, a charge module may control a current flowing from an external power source to the battery. For example, the charge module may ensure stable operation of the apparatus and/or may protect internal circuits by limiting or maintaining the sizes of the current and voltage from the external power source. An amount of current flowing from the external power source may excessively increase due to an unexpected circumstance, such as power consumption caused by the operation of the apparatus while the battery is charged. When the amount of current flowing from the external power source increases, the battery may be degraded and/or the lifespan of the battery may be reduced.

SUMMARY

Some example embodiments may provide charging circuits capable of preventing degradation of the life-span of batteries.

Some example embodiments may provide charging systems including charging circuits capable of preventing degradation of the life-span of batteries.

Some example embodiments may provide wireless power reception devices including charging circuits and/or charging systems capable of preventing degradation of the life-span of batteries.

In some example embodiments, a charging circuit may comprise: a battery unit in which a rechargeable battery is mounted; a charging unit configured to provide a charging current to the rechargeable battery in the battery unit, based on a direct current (DC) voltage converted from an alternating current (AC) voltage, and configured to charge the rechargeable battery; and/or a controller configured to control the charging unit such that the charging unit provides the rechargeable battery with a first charging current following a first current profile in a first charging mode as the charging current at least in a first period of the first charging mode, based on the charging current, a battery voltage of the rechargeable battery, and a temperature of the rechargeable battery, wherein the first current profile is smaller than an available maximum current in the first period.

In some example embodiments, the first charging mode may include the first period and a second period successive to the first period, wherein the first and second periods are divided based on a comparison of magnitudes of the charging current and the available maximum current. The controller may be further configured to control the charging unit such that the charging unit provides the rechargeable battery with a second charging current, which is smaller than the first current profile, as the charging current in the second period.

In some example embodiments, a charging mode of the charging circuit may transit from the first charging mode to a second charging mode after the second period ends. The second charging mode may include a third period, in which the charging unit provides the rechargeable battery with the second charging current, and a fourth period, in which the charging unit provides the rechargeable battery with a third charging current that follows a second current profile, which is smaller than the second charging current, as the charging current.

In some example embodiments, the controller may be further configured to control the charging unit such that the charging current multiplied by the rechargeable battery voltage has a constant value in the first period of the first charging mode.

In some example embodiments, the controller may be further configured to control the charging unit such that charging current has a fixed value in the first period of the first charging mode.

In some example embodiments, the controller may be further configured to control the charging unit such that the battery voltage has a constant value in the fourth period of the second charging mode.

In some example embodiments, the charging circuit may further comprise: a temperature sensor, connected to the battery unit, configured to sense the temperature of the rechargeable battery to provide a temperature signal.

In some example embodiments, the temperature sensor may be a thermistor that has a negative temperature coefficient.

In some example embodiments, the rechargeable battery may be a lithium ion secondary battery. The available maximum current may be a maximum value of the charging current that prevents lithium plating at a negative electrode of the lithium ion secondary battery in the first charging mode.

In some example embodiments, the controller may be further configured to compare the charging current with the available maximum current, based on the battery voltage and the temperature of the rechargeable battery, to generate a plurality of control signals that control the charging unit according to a result of the comparison.

In some example embodiments, the controller may comprise a look-up table that stores the available maximum current with respect to each battery voltage and each temperature of the rechargeable battery.

In some example embodiments, the controller may further comprise: a current calculation unit configured to calculate the charging current based on first and second voltage signals; a differential amplifier configured to amplify a difference between the charging current and the available maximum current to provide a first current signal; an analog-to-digital converter (ADC) configured to convert the first current signal to a second current signal that is digital signal; and/or a control signal generator configured to generate the plurality of control signals based on the second current signal and the second voltage signal associated with the battery voltage.

In some example embodiments, the controller may further comprise: an analog-to-digital converter (ADC) configured to convert a first voltage signal, a second voltage signal, and the temperature of the rechargeable battery to a corresponding first digital voltage signal, second digital voltage signal, and digital temperature signal; a current calculation unit configured to calculate a digital charging current, corresponding to the charging current, based on the first and second digital voltage signals; a digital comparator configured to compare the digital charging current with an available maximum digital current corresponding to the available maximum current to provide a digital current signal corresponding to a difference between the digital charging current and the available digital maximum current; and/or a control signal generator configured to generate the plurality of control signals based on the digital current signal and the second digital voltage signal associated with the battery voltage.

In some example embodiments, the controller may comprise an operation unit configured to calculate the available maximum current with respect to each battery voltage and each temperature of the rechargeable battery.

In some example embodiments, the operation unit may be further configured to calculate the available maximum current using a function that receives the battery voltage and the temperature of the rechargeable battery and outputs the available maximum current.

In some example embodiments, the charging unit may comprise: a charging current providing unit configured to provide the charging current based on the DC voltage in response to first and second control signals of the plurality of control signals; an inductor configured to store the charging current; and/or a switch, connected between the inductor and the rechargeable battery, configured to selectively provide the rechargeable battery with the charging current stored in the inductor in response to a third control signal of the plurality of control signals.

In some example embodiments, the controller may be further configured to control the charging unit such that the charging unit provides the rechargeable battery with a preliminary charging current as the charging current. The preliminary charging current may be smaller than the first charging current in a preliminary charging mode preceding the first charging mode.

In some example embodiments, a charging system may comprise: a rechargeable battery; a system load; a charging circuit configured to receive a direct current (DC) voltage from an adapter, configured to provide a charging current to the rechargeable battery to charge the rechargeable battery, and configured to supply power to the system load; and/or a switch configured to selectively connect the rechargeable battery with the system load according to an overload condition of the adapter. The charging circuit may comprise: a charging unit configured to provide the charging current to the rechargeable battery based on the DC voltage; and/or a controller configured to control the charging unit such that the charging unit provides the rechargeable battery with a first charging current following a first current profile in a first charging mode as the charging current at least in a first period of the first charging mode, based on the charging current, a battery voltage of the rechargeable battery, and a temperature of the rechargeable battery, wherein the first current profile is smaller than an available maximum current in the first period.

In some example embodiments, the charging circuit may be further configured to apply a switching control signal to the switch such that the rechargeable battery is connected to the system load when the power required by the system load is more than the adapter can provide.

In some example embodiments, the charging circuit may be further configured to apply a switching control signal to the switch such that the rechargeable battery is disconnected from the system load when the power required by the system load is not more than the adapter can provide.

In some example embodiments, the charging circuit may further comprise: a temperature sensor, connected to the rechargeable battery, configured to sense the temperature of the rechargeable battery to provide a temperature signal. The temperature sensor may be a thermistor that has a negative temperature coefficient.

In some example embodiments, a wireless power reception device may comprise: a rechargeable battery; a rectifier configured to rectify an input voltage to provide a rectified voltage, wherein the input voltage is generated based on energy in a target resonator through magnetic resonance from a source resonator; a voltage converter configured to convert the rectified voltage to an output voltage; and/or a charging circuit configured to receive the output voltage, and configured to provide a charging current to the rechargeable battery to charge the rechargeable battery. The charging circuit may comprise: a charging unit configured to provide the charging current to the rechargeable battery based on the output voltage; and/or a controller configured to control the charging unit such that the charging unit provides the rechargeable battery with a first charging current following a first current profile in a first charging mode as the charging current at least in a first period of the first charging mode, based on the charging current, a battery voltage of the rechargeable battery, and a temperature of the rechargeable battery, wherein the first current profile is smaller than an available maximum current in the first period.

In some example embodiments, the target resonator may be configured to receive the energy from the source resonator through electromagnetic induction.

In some example embodiments, the target resonator may be configured to receive the energy from the source resonator through electromagnetic resonance.

In some example embodiments, the voltage converter may be a buck converter.

In some example embodiments, a charging system may comprise: a charging circuit; a rechargeable battery; a system load; and/or a switch. The charging circuit may be configured to receive direct current (DC) voltage, to provide charging current to the rechargeable battery, and to supply power to the system load. The switch may be configured to selectively connect the rechargeable battery to the system load according to a power demand of the system load. The charging circuit may comprise: a charging unit configured to provide the charging current to the rechargeable battery based on the DC voltage; and/or a controller configured to control the charging unit such that the charging current follows a first current profile in at least a first period of a first charging mode based on the charging current, a battery voltage of the rechargeable battery, and a temperature of the rechargeable battery. The first current profile may be smaller than an available maximum current in the first period.

In some example embodiments, the charging circuit may be further configured to apply a signal to the switch such that the rechargeable battery is connected to the system load when the power demand of the system load is greater than an available power associated with the DC voltage.

In some example embodiments, the charging circuit may be further configured to apply a signal to the switch such that the rechargeable battery is not connected to the system load when the power demand of the system load is less than an available power associated with the DC voltage.

In some example embodiments, the charging circuit may further comprise: a temperature sensor configured to sense the temperature of the rechargeable battery.

In some example embodiments, the temperature sensor may be a thermistor.

In some example embodiments, the temperature sensor may have a negative temperature coefficient.

BRIEF DESCRIPTION OF THE DRAWINGS

The above and/or other aspects and advantages will become more apparent and more readily appreciated from the following detailed description of example embodiments, taken in conjunction with the accompanying drawings, in which:

FIG. 10 illustrates the look-up table of FIG. 9;

DETAILED DESCRIPTION

Figure 1:
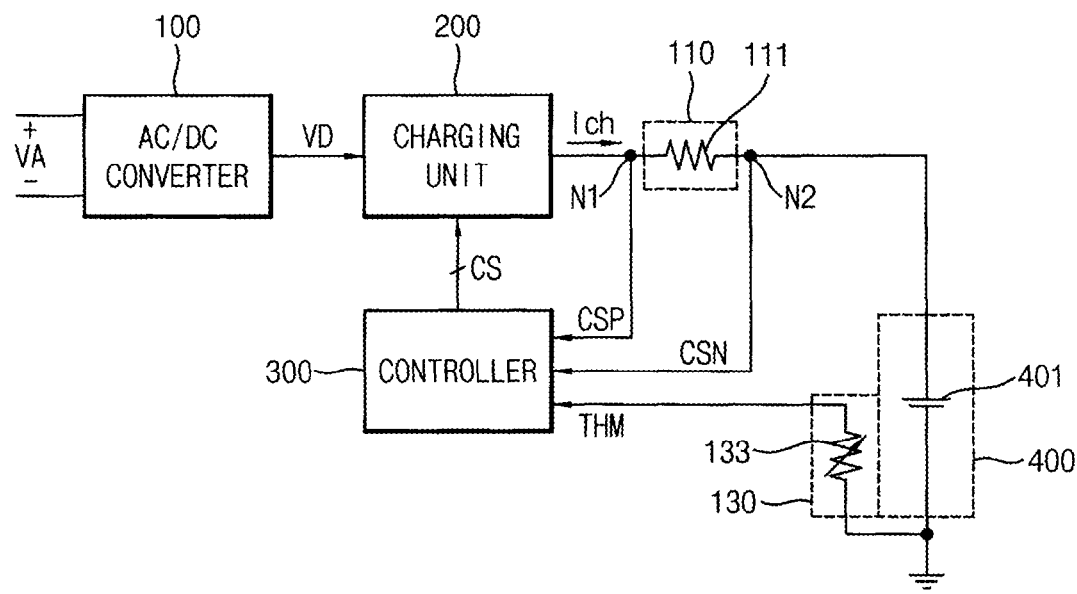
FIG. 1 is a block diagram illustrating a charging circuit according to some example embodiments.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Example embodiments may be described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will typically have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature, their shapes are not intended to illustrate the actual shape of a region of a device, and their shapes are not intended to limit the scope of the example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Reference will now be made to example embodiments, which are illustrated in the accompanying drawings, wherein like reference numerals may refer to like components throughout.

FIG. 1 is a block diagram illustrating a charging circuit according to some example embodiments.

Referring to FIG. 1, a charging circuit 10 includes an alternating current (AC) to direct current (DC) converter 100, a charging unit 200, a sensing unit 110, a controller 300, a battery unit 400, and a temperature sensor 130. The sensing unit 110 may be implemented by a resistor 111. A rechargeable battery 401, that is, a lithium ion secondary battery, may be mounted in the battery unit 400. The temperature sensor 130 may be implemented by a thermistor 133 that has a negative temperature coefficient (NTC).

The AC to DC converter 100 converts an input AC voltage VA to a DC voltage VD, and provides the DC voltage VD to the charging unit 200. The AC to DC converter 100 may be implemented by an adapter or may be included in an adapter.

The charging unit 200 receives the DC voltage VD, generates a charging current Ich based on the DC voltage VD, and provides the charging current Ich to the rechargeable battery 401. The sensing unit 110 may include the resistor 111, and the sensing unit 110 may be connected to first and second nodes N1 and N2 between the charging unit 200 and the battery unit 400. The sensing unit 110 provides a first voltage signal CSP at the first node N1 and provides a second voltage signal CSN at the second node N2. The resistance of the resistor 111 is a desired value (that may or may not be predetermined), and a level of the charging current Ich may be calculated based on the resistance of the resistor 111 and the first and second voltage signals CSP and CSN (e.g., voltages at the two ends of the resistor 111).

The rechargeable battery 401 is mounted in the battery unit 400. The rechargeable battery 401 may be charged by receiving the charging current Ich. The rechargeable battery 401 may include a lithium ion secondary battery. The temperature sensor 130 is connected close to the battery unit 400, senses a temperature of the rechargeable battery 401, and provides a temperature signal THM to the controller 300. The temperature sensor 130 may include thermistor 133 that has a negative temperature coefficient (NTC). The thermistor 133 is a resistor whose resistance varies according to a change in the temperature. The NTC thermistor 133 has a resistance that decreases with an increase in temperature. However, the temperature sensor 130 is not limited to the NTC thermistor 133.

The controller 300 receives the first and second voltage signals CSP and CSN and the temperature signal THM and calculates the level (or magnitude) of the charging current Ich based on the first and second voltage signals CSP and CSN. The second voltage signal CSN is a voltage applied to a positive electrode of the rechargeable battery 401. The second voltage signal CSN may indicate a battery voltage of the rechargeable battery 401. Therefore, the controller 300 may control the charging unit 200 according to a charging mode based on the first and second voltage signals CSP and CSN and the temperature signal THM such that a lithium plating phenomenon does not occur at a negative electrode of the rechargeable battery 401 due to the charging current Ich. That is, the controller 300 may control the charging unit 200 via control signal(s) CS according to a charging mode based on the first and second voltage signals CSP and CSN and the temperature signal THM such that a level of the charging current Ich is adjusted.

Figure 2:
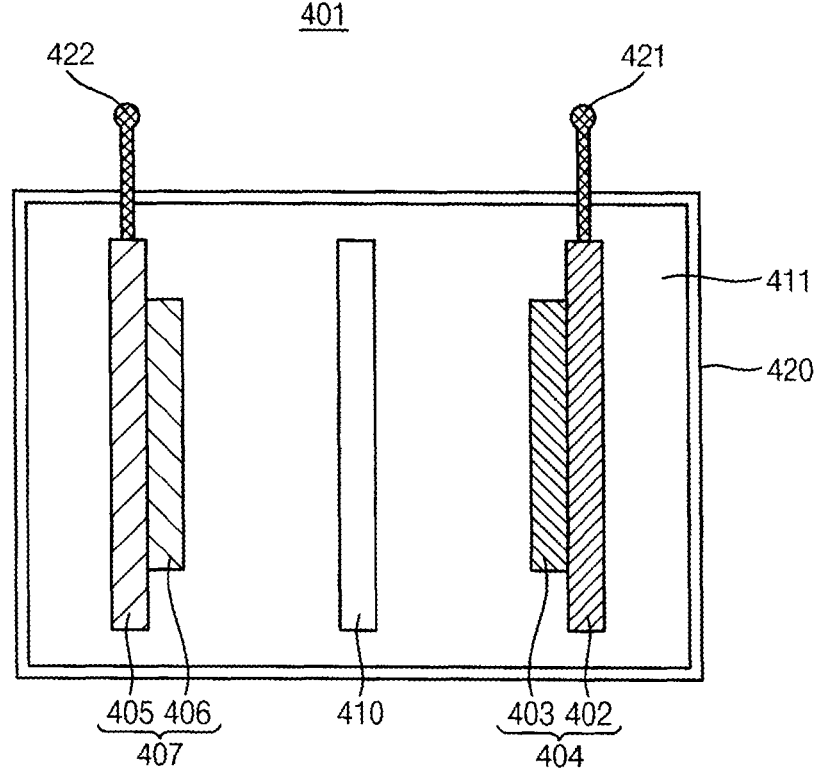
FIG. 2 illustrates a structure of the rechargeable battery of FIG. 1.

FIG. 2 illustrates a structure of the rechargeable battery 401 of FIG. 1.

Referring to FIG. 2, in the rechargeable battery 401, which may be a lithium ion secondary battery, a positive electrode 404, a negative electrode 407, and a separator 410 are provided in a housing 420 which isolates the components from the outside, and the housing 420 is filled with an electrolyte 411. The separator 410 is provided between the positive electrode 404 and the negative electrode 407.

In the positive electrode 404, a positive electrode active material layer 403 is provided in contact with a positive electrode current collector 402. In this specification, the positive electrode active material layer 403 and the positive electrode current collector 402 provided with the positive electrode active material layer 403 are collectively referred to as the positive electrode 404.

On the other hand, a negative electrode active material layer 406 is provided in contact with a negative electrode current collector 405. In this specification, the negative electrode active material layer 406 and the negative electrode current collector 405 provided with the negative electrode active material layer 406 are collectively referred to as the negative electrode 407.

The positive electrode current collector 402 and the negative electrode current collector 405 are connected to a terminal portion 421 and a terminal portion 422, respectively. Charge and discharge are performed through the terminal portion 421 and the terminal portion 422.

Although, in the illustrated structure, there are gaps between the positive electrode active material layer 403 and the separator 410 and between the negative electrode active material layer 406 and the separator 410, but example embodiments are not limited to this structure. The positive electrode active material layer 403 may be in contact with the separator 410, and the negative electrode active material layer 406 may be in contact with the separator 410. Further, the rechargeable battery 401 (e.g., a lithium ion secondary battery) may be rolled into a cylinder with the separator 410 provided between the positive electrode 404 and the negative electrode 407.

The positive electrode current collector 402 can be formed using a highly conductive material, such as a metal typified by stainless steel, gold, platinum, zinc, iron, copper, aluminum, or titanium, or an alloy thereof. Alternatively, the positive electrode current collector 402 can be formed using an aluminum alloy, to which an element that improves heat resistance, such as silicon, titanium, neodymium, scandium, or molybdenum, is added. Further alternatively, the positive electrode current collector 402 may be formed using a metal element that forms silicide by reacting with silicon. Examples of the metal element that forms silicide by reacting with silicon include zirconium, titanium, hafnium, vanadium, niobium, tantalum, chromium, molybdenum, tungsten, cobalt, nickel, and the like. The positive electrode current collector 402 can have a foil-like shape, a plate-like shape (a sheet-like shape), a net-like shape, a punching-metal shape, an expanded-metal shape, or the like as appropriate. In some example embodiments, aluminum foil is used as the positive electrode current collector 402.

In some example embodiments, lithium iron phosphate (LiFePO$_4$) having an olivine structure is used as a positive electrode active material included in the positive electrode active material layer 403.

In lithium iron phosphate having an olivine structure, the diffusion path of lithium ions is unidimensional. Thus, as crystallinity is high, the diffusion path of lithium ions is ensured, and insertion and extraction of a large amount of lithium ions is possible. Further, since lithium iron phosphate includes iron, the capacitance is large. In addition, iron phosphate (FePO$_4$), which is obtained by completely extracting lithium from lithium iron phosphate, is also stable; therefore, the capacity of a lithium ion secondary battery formed using lithium iron phosphate can be increased safely.

Note that an active material refers to a material that relates to intercalation and deintercalation of ions that function as carriers. When an electrode (a positive electrode, a negative electrode, or both of them) is formed, an active material layer in which an active material is mixed with a conductive additive, a binding agent, a solvent, and the like is formed over a current collector. Thus, the active material and the active material layer are distinguished. Accordingly, the positive electrode active material and the positive electrode active material layer 403 are distinguished, and a negative electrode active material to be described later and the negative electrode active material layer 406 are distinguished.

The positive electrode active material layer 403 may include a known conductive additive or binding agent (also referred to as a binder). In some example embodiments, acetylene black (AB) is used as a conductive additive and polyvinylidene fluoride (PVDF) is used as a binding agent.

The negative electrode current collector 405 is formed using a highly conductive material such as metal, for example. As the highly conductive material, stainless steel, iron, aluminum, copper, nickel, or titanium can be used, for example. The negative electrode current collector 405 can have a foil-like shape, a plate-like shape (a sheet-like shape), a net-like shape, a punching-metal shape, an expanded-metal shape, or the like as appropriate. In some example embodiments, copper foil is used as the negative electrode current collector 405.

The negative electrode active material layer 406 includes a negative electrode active material which can occlude and release ions serving as carriers. In some example embodiments, spherical graphite is used as the negative electrode active material included in the negative electrode active material layer 406.

A passivating film, formed by reduction and decomposition of ethylene carbonate (EC) serving as a solvent (to be described later) of the electrolyte 411, is formed on a surface of the graphite used as the negative electrode active material. With the passivating film, the solvent is prevented from further being decomposed and intercalation of lithium ions into the graphite, which is the negative electrode active material, is possible.

The negative electrode active material layer 406 may include a known conductive additive or binding agent. In some example embodiments, acetylene black (AB) is used as a conductive additive and polyvinylidene fluoride (PVDF) is used as a binding agent.

The negative electrode active material layer 406 may be pre-doped with lithium. Pre-doping with lithium may be performed in such a manner that a lithium layer is formed on a surface of the negative electrode active material layer 406 by a sputtering method. Alternatively, lithium foil is provided on the surface of the negative electrode active material layer 406, whereby the negative electrode active material layer 406 can be pre-doped with lithium.

The electrolyte 411 includes a solute and a solvent. As the solute of the electrolyte 411, a material including carrier ions is used. In some example embodiments, the solute may include lithium salts such as LiPF$_6$, LiClO$_4$, LiAsF$_6$, LiBF$_4$, and Li(C$_2$F$_5$SO$_2$)$_2$N. In some example embodiments, LiPF$_6$ is used as the solute.

As the solvent of the electrolyte 411, a material in which carrier ions can transfer is used. As the solvent of the electrolyte, an aprotic organic solvent is preferably used. In some example embodiments, a mixed solution of ethylene carbonate (EC) and diethyl carbonate (DEC) is used.

As described above, ethylene carbonate is reduced and decomposed, and a passivating film is formed on a surface of the graphite, which is the negative electrode active material; therefore, ethylene carbonate is suitable for the solvent of the electrolyte 111. However, since ethylene carbonate is in a solid state at room temperature, a solution in which ethylene carbonate is dissolved in diethyl carbonate is used as the solvent.

An insulating porous material can be used as the separator 410. For example, paper; nonwoven fabric; a glass fiber; ceramics; a synthetic fiber containing nylon (polyamide), vinylon (polyvinyl alcohol based fiber), polyester, acrylic, polyolefin, or polyurethane; or the like may be used. Note that a material which is not dissolved in the electrolyte 411 should be selected.

Figure 3:
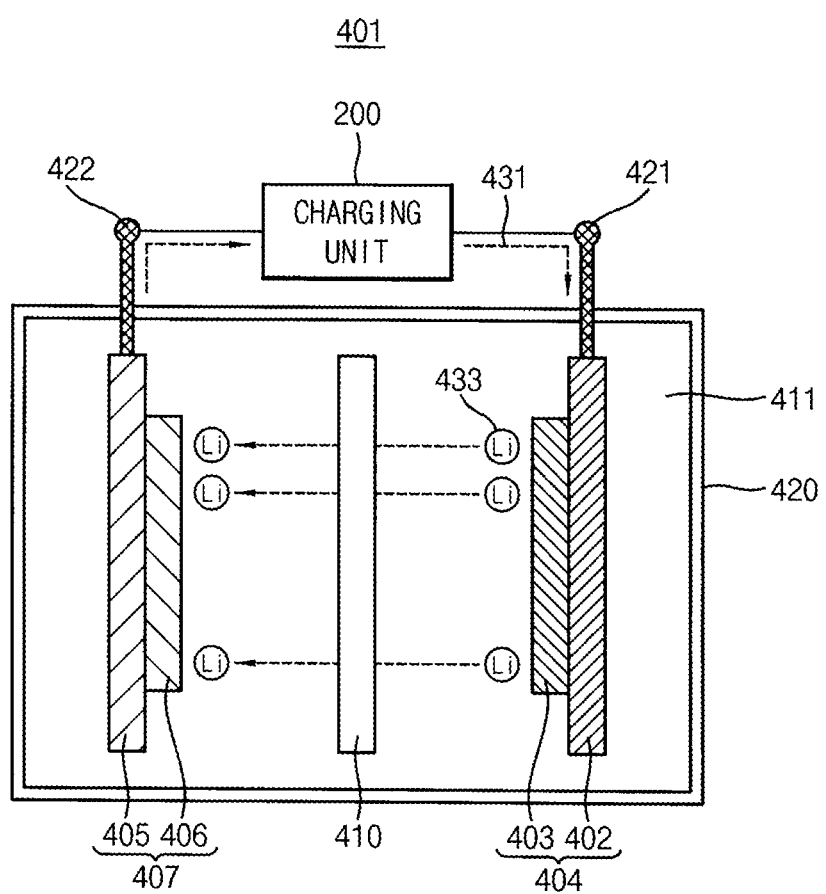
FIG. 3 illustrates that the rechargeable battery of FIG. 2 is charged.

FIG. 3 illustrates that the rechargeable battery 401 of FIG. 2 is charging.

Figure 4:
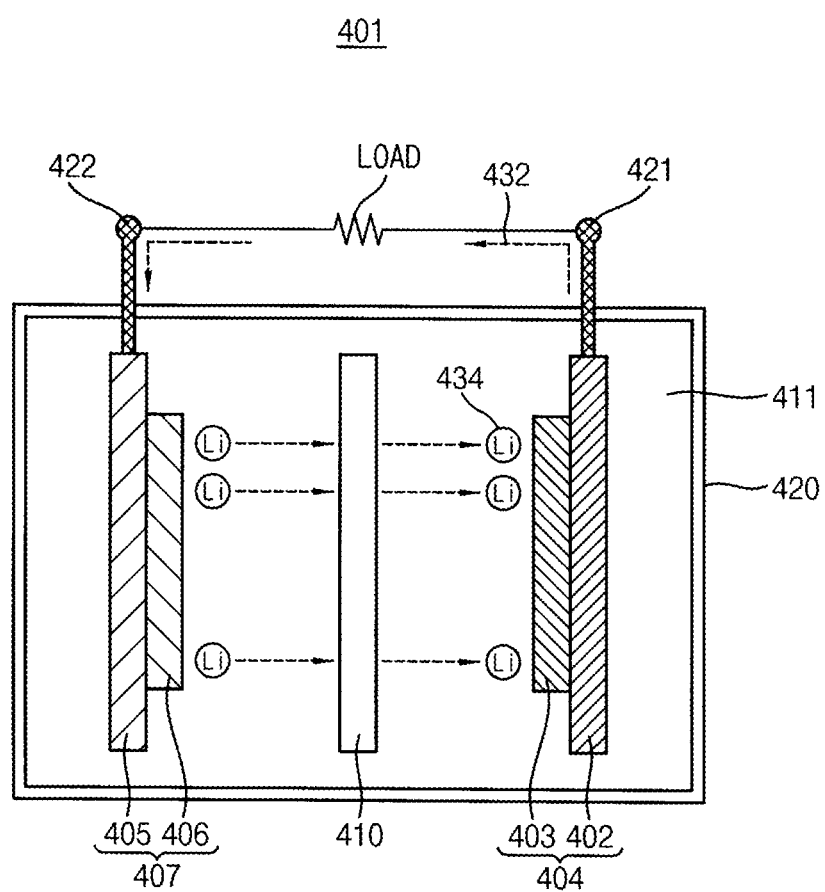
FIG. 4 illustrates that the rechargeable battery of FIG. 2 is discharged.

FIG. 4 illustrates that the rechargeable battery 401 of FIG. 2 is discharging.

In FIGS. 3 and 4, the rechargeable battery 401 is implemented by a lithium ion secondary battery.

Referring to FIG. 3, for charging the rechargeable battery 401, the charging unit 200 is connected between the terminal portions 421 and 422 to provide the charging current to the positive electrode 404, as a reference numeral 431 indicates. When the charging current Ich is provided to the positive electrode 404, lithium ions 433 are transferred to the negative electrode 407 through the separator 410. Therefore, the rechargeable battery 401 may be charged. When the level of the charging current Ich excessively increases, a lithium plating phenomenon, in which lithium ions are accumulated on an interface between the negative electrode 407 and the electrolyte 411, may occur when a first amount of lithium ions transferred to the negative electrode 407 from the positive electrode 404 is greater than a second amount of lithium ions diffused at the negative electrode 407.

Referring to FIG. 4, when the rechargeable battery 401 is discharging, a load LOAD is connected between the terminal portions 421 and 422, and a current is provided to the negative electrode 407 from the rechargeable battery 401, as a reference numeral 432 indicates. When the current is provided to the negative electrode 407 through the terminal portion 422, lithium ions 434 are transferred to the positive electrode 404 through the separator 410 from the negative electrode 407.

Figure 5A:
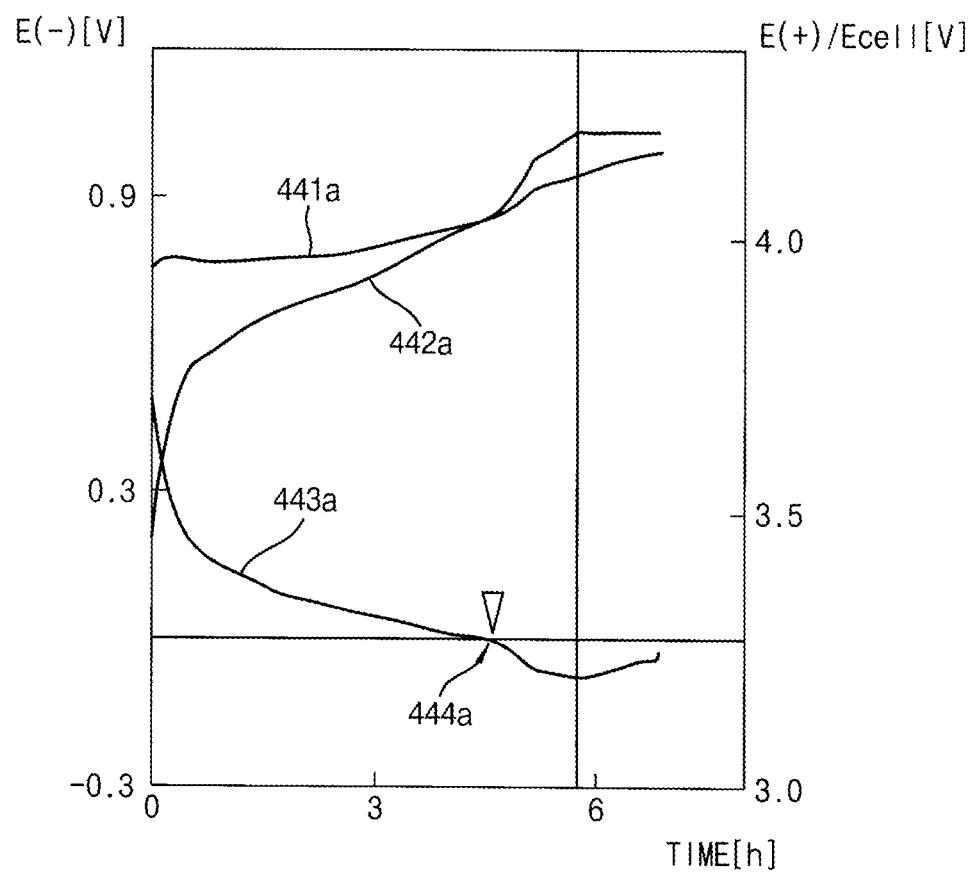
FIGS. 5A and 5B are graphs for explaining a lithium plating phenomenon according to a temperature of a battery.
Figure 5B:
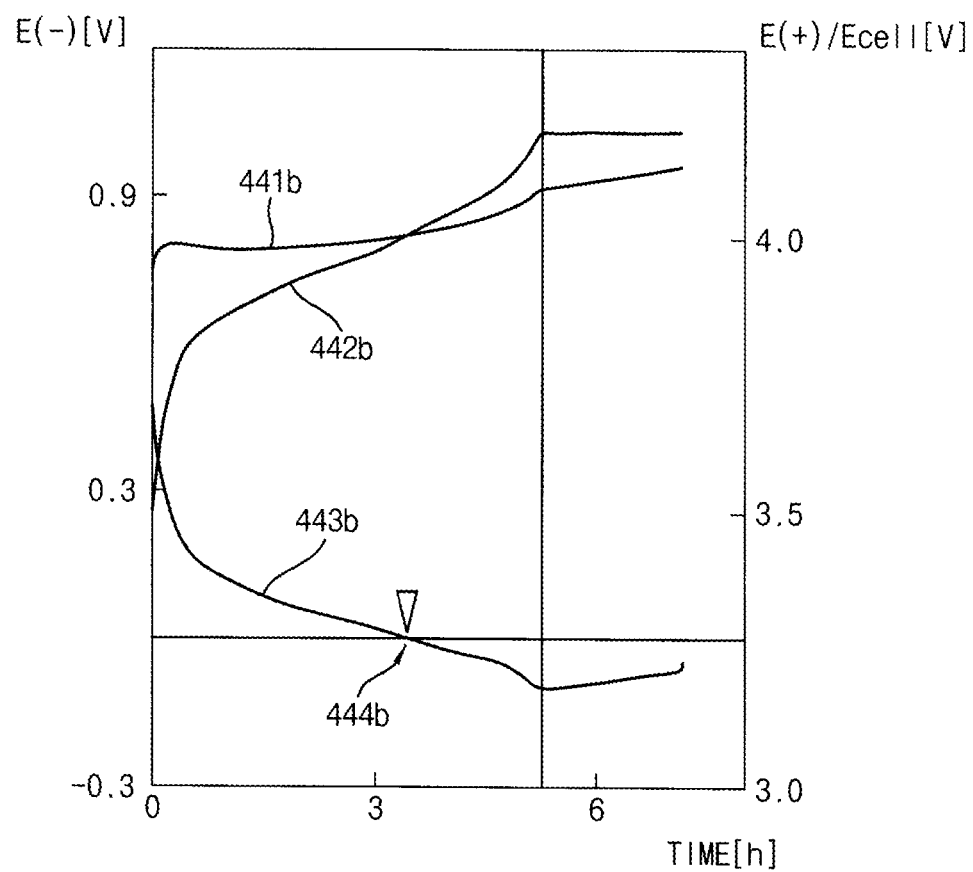

FIGS. 5A and 5B are graphs for explaining a lithium plating phenomenon according to a temperature of a battery.

FIGS. 5A and 5B illustrate battery voltage and density of lithium ions at the positive and negative electrodes of the rechargeable battery 401 when a charging current Ich having 0.16 C is provided to the rechargeable battery 401.

In some example embodiments, a current value at which a fully charged rechargeable battery 401 can be discharged to a state of charge (SOC) of 0% in one hour is taken as 1 C (amps).

FIG. 5A represents a case when a temperature or an ambient temperature of the rechargeable battery 401 is 10° C., and FIG. 5B represents a case when a temperature or an ambient temperature of the rechargeable battery 401 is 0° C.

In FIGS. 5A and 5B, E(−) denotes potential of the negative electrode 407 of the rechargeable battery 401, E(+) denotes potential of the positive electrode 404 of the rechargeable battery 401, and Ecell denotes a battery voltage of the rechargeable battery 401. In FIGS. 5A and 5B, potentials and battery voltages are given in volts (V), and times are given in hours (h).

In FIG. 5A, a reference numeral 441a denotes the battery voltage of the rechargeable battery 401, a reference numeral 442a denotes a density of Li/Li+ at the positive electrode 404 of the rechargeable battery 401, and reference numeral 443a denotes a density of Li/Li+ at the negative electrode 407 of the rechargeable battery 401. In addition, a reference numeral 444a denotes a time when the lithium plating phenomenon occurs in the negative electrode 407 of the rechargeable battery 401.

In FIG. 5B, a reference numeral 441b denotes the battery voltage of the rechargeable battery 401, a reference numeral 442b denotes a density of Li/Li+ at the positive electrode 404 of the rechargeable battery 401, and reference numeral 443b denotes a density of Li/Li+ at the negative electrode 407 of the rechargeable battery 401. In addition, a reference numeral 444b denotes a time when the lithium plating phenomenon occurs in the negative electrode 407 of the rechargeable battery 401.

Referring to FIGS. 5A and 5B, it is noted that the lithium plating phenomenon well occurs in the negative electrode 407 of the rechargeable battery 401 as the temperature or the ambient temperature of the rechargeable battery 401 goes lower.

Figure 6A:
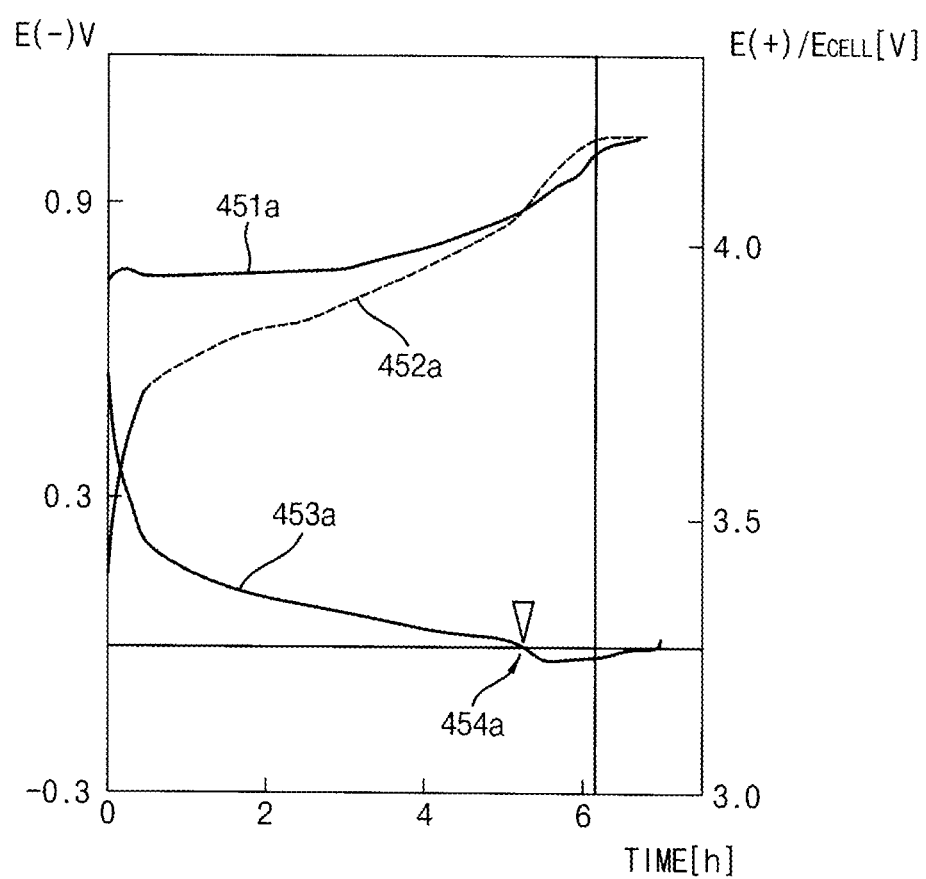
FIGS. 6A and 6B are graphs for explaining a lithium plating phenomenon according to a level of the charging current.
Figure 6B:
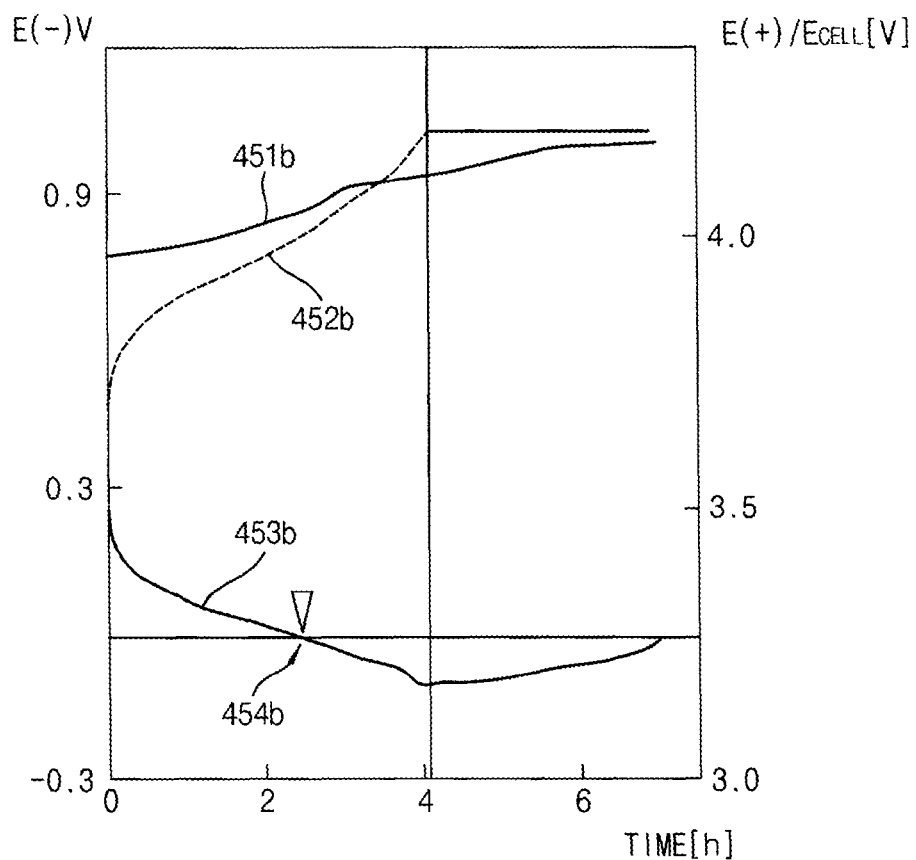

FIGS. 6A and 6B are graphs for explaining a lithium plating phenomenon according to a level of the charging current.

FIGS. 6A and 6B illustrates battery voltage and density of lithium ions at the positive and negative electrodes of the rechargeable battery 401 when a charging current Ich varies at room temperature.

FIG. 6A represents a case when the charging current Ich of 0.16 C is provided the rechargeable battery 401 and FIG. 6B represents a case when the charging current Ich of 0.4 C is provided the rechargeable battery 401.

In some example embodiments, a current value at which a fully charged rechargeable battery 401 can be discharged to the state of charge (SOC) of 0% in one hour is taken as 1 C (amps).

In FIGS. 6A and 6B, E(−) denotes potential of the negative electrode 407 of the rechargeable battery 401, E(+) denotes potential of the positive electrode 404 of the rechargeable battery 401, and Ecell denotes a battery voltage of the rechargeable battery 401. In FIGS. 6A and 6B, potentials and battery voltages are given in volts (V), and times are given in hours (h).

In FIG. 6A, a reference numeral 451a denotes the battery voltage of the rechargeable battery 401, a reference numeral 452a denotes a density of Li/Li+ at the positive electrode 404 of the rechargeable battery 401, and reference numeral 453a denotes a density of Li/Li+ at the negative electrode 407 of the rechargeable battery 401. In addition, a reference numeral 454a denotes a time when the lithium plating phenomenon occurs in the negative electrode 407 of the rechargeable battery 401.

In FIG. 6B, a reference numeral 451b denotes the battery voltage of the rechargeable battery 401, a reference numeral 452b denotes a density of Li/Li+ at the positive electrode 404 of the rechargeable battery 401, and reference numeral 453b denotes a density of Li/Li+ at the negative electrode 407 of the rechargeable battery 401. In addition, a reference numeral 454b denotes a time when the lithium plating phenomenon occurs in the negative electrode 407 of the rechargeable battery 401.

Referring to FIGS. 6A and 6B, it is noted that the lithium plating phenomenon well occurs in the negative electrode 407 of the rechargeable battery 401 as the level of the charging current Ich increases.

Figure 7:
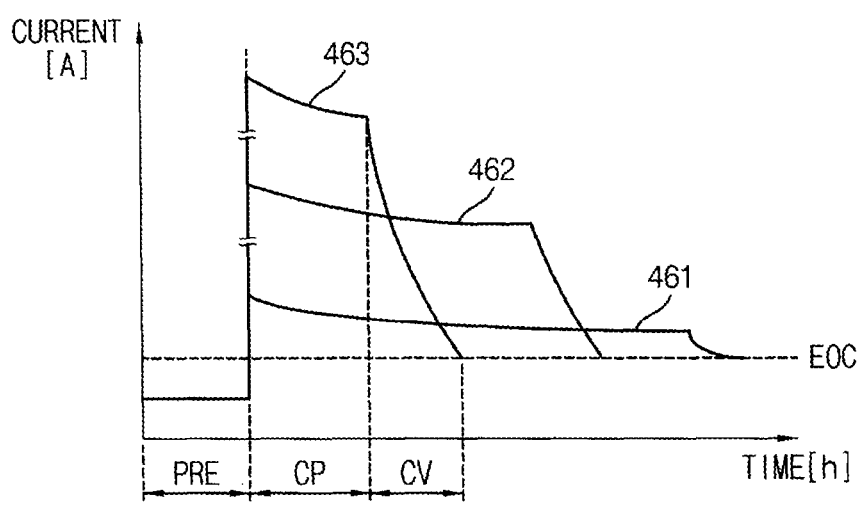
FIG. 7 is a graph illustrating a relationship between an input power and a charging time in the charging circuit according to some example embodiments.

FIG. 7 is a graph illustrating a relationship between an input power and a charging time in the charging circuit according to some example embodiments. In FIG. 7, current is given in amps (A) and times are given in hours (h).

FIG. 7 illustrates a relationship an input power, a corresponding charging current, and a charging time when the charging circuit 10 operates in a preliminary charging mode PRE, a constant power mode CP, and a constant voltage mode CV. In FIG. 7, EOC denotes an end of charge. In FIG. 7, a reference numeral 461 denotes a level of the charging current when the input power has a first level, a reference numeral 462 denotes a level of the charging current when the input power has a second level, and a reference numeral 463 denotes a level of the charging current when the input power has a third level. Therefore, it is noted that charging time decreases as the level of the charging current increases in response to increasing level of the input power. When the charging circuit 10 operates in the constant power mode CP or the constant voltage mode CV, the charging time decreases as the level of the constant power or constant voltage is higher.

Figure 8A:
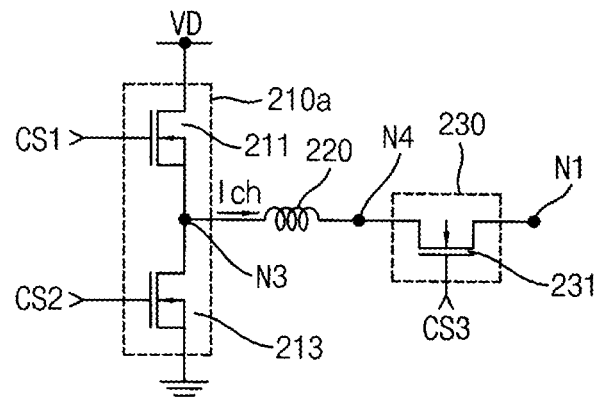
FIG. 8A is a circuit diagram illustrating an example of the charging unit of FIG. 1 according to some example embodiments.

FIG. 8A is a circuit diagram illustrating an example of the charging unit of FIG. 1 according to some example embodiments.

Referring to FIG. 8A, a charging unit 200a may include a charging current providing unit 210a, an inductor 220, and a switch 230. The charging current providing unit 210a includes n-channel metal-oxide semiconductor (NMOS) transistors 211 and 213 connected in series between the DC voltage VD and a ground voltage. The NMOS transistor 211 has a drain connected to the DC voltage VD, a source connected to a node N3, and a gate receiving a first control signal CS1. The NMOS transistor 213 has a drain connected to the node N3, a source connected to the ground voltage, and a gate receiving a second control signal CS2. The inductor 220 is connected between the node N3 and a node N4, and may store the charging current Ich from the node N3. The switch 230 includes an NMOS transistor 231 connected between the node N4 and a node N1 and the NMOS transistor 231 is turned on or off in response to a third control signal CS3 to selectively provide the charging current Ich to the sensing unit 110.

The NMOS transistor 211 adjusts an amount of current flowing to the node N3 from the DC voltage VD in response to the first control signal CS1, and the NMOS transistor 213 adjusts an amount of current sinking to the ground from the node N3 in response to the second control signal CS2. Therefore, the charging current providing unit 210a adjusts the level of the charging current Ich provided to the node N1 in response to the first and second control signals CS1 and CS2.

The NMOS transistor 231 is turned on or off in response to the third control signal CS3 to selectively provide the charging current Ich to the rechargeable battery 401. When the rechargeable battery 401 is fully charged, the NMOS transistor 231 is turned off in response to the third control signal CS3.

Figure 8B:
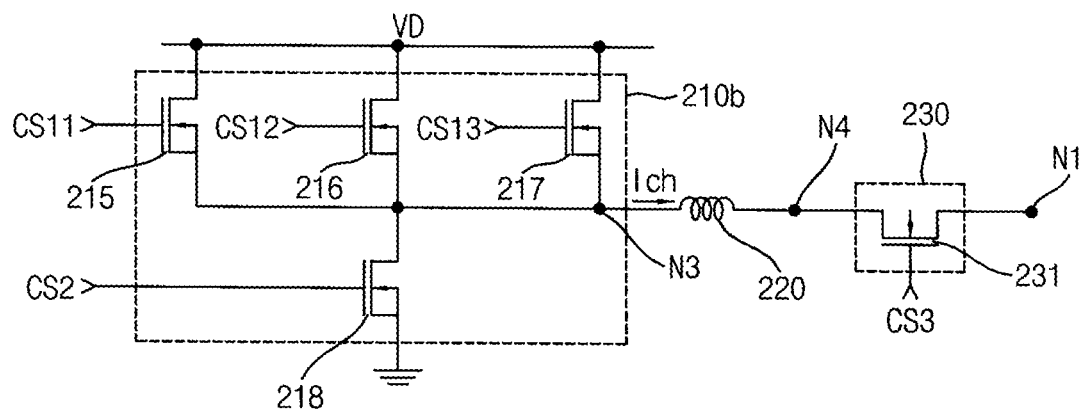
FIG. 8B is a circuit diagram illustrating an example of the charging unit of FIG. 1 according to some example embodiments.

FIG. 8B is a circuit diagram illustrating an example of the charging unit of FIG. 1 according to some example embodiments.

Referring to FIG. 8B, a charging unit 200b may include a charging current providing unit 210b, an inductor 220, and a switch 230.

The charging current providing unit 210b includes NMOS transistors 215-218. The NMOS transistors 215, 216, and 217 are connected in parallel between the DC voltage VD and the node N3, and first control signals CS11, CS12, and CS13 may be applied to gates of the NMOS transistors 215, 216, and 217, respectively. The NMOS transistor 218 has a drain connected to the node N3, a source connected to the ground voltage, and a gate receiving a second control signal CS2. The inductor 220 is connected between the node N3 and a node N4, and may store the charging current Ich from the node N3. The switch 230 includes an NMOS transistor 231 connected between the node N4 and a node N1 and the NMOS transistor 231 is turned on or off in response to a third control signal CS3 to selectively provide the charging current Ich to the sensing unit 110. Each of the NMOS transistors 215, 216, and 217 adjusts amount of the current flowing to the node N3 in response to each of the first control signals CS11, CS12, and CS13.

Figure 9:
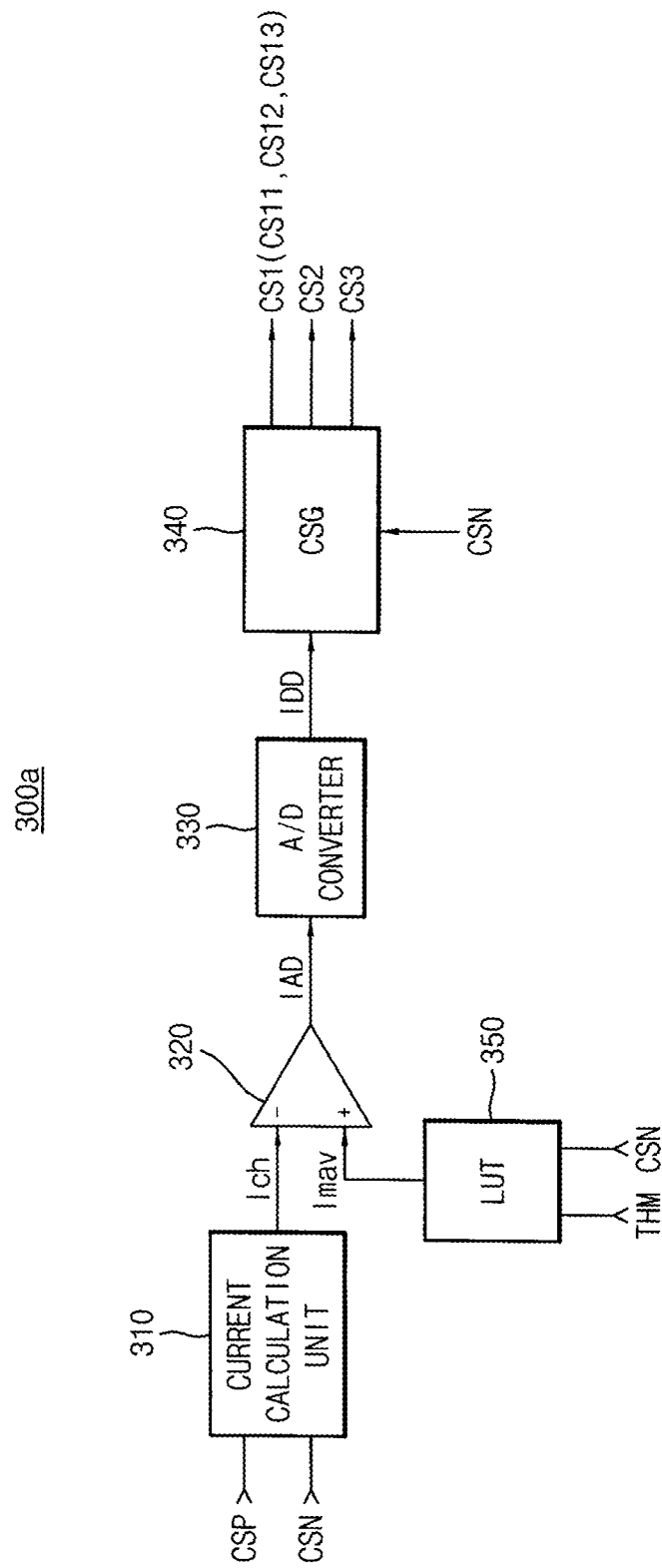
FIG. 9 is a block diagram illustrating an example of the controller of FIG. 1 according to some example embodiments.

FIG. 9 is a block diagram illustrating an example of the controller of FIG. 1 according to some example embodiments.

Referring to FIG. 9, a controller 300a includes a current calculation unit 310, an operational amplifier 320, an analog-to-digital converter (ADC) 330, a control signal generator (CSG) 340, and a look-up table (LUT) 350.

The current calculation unit 310 receives the first and second voltage signals CSP and CSN, and calculates the charging current Ich based on the first and second voltage signals CSP and CSN and a resistance of the resistor 111. The resistance of the resistor 111 is stored in the current calculation unit 310 in advance. The current calculation unit 310 provides the charging current Ich to the operational amplifier 320. The operational amplifier 320 compares the charging current Ich and an available maximum current Imav stored in the look-up table 350, amplifies a difference between the charging current Ich and the available maximum current Imav, and provides a first current signal IAD, which is an analog signal. The look-up table 350 receives the temperature signal THM, which indicates the temperature or the ambient temperature of the rechargeable battery 401, and the second voltage signal CSN, which indicates the battery voltage of the rechargeable battery 401, and provides the available maximum current Imav corresponding to the temperature signal THM and the second voltage signal CSN.

The ADC 330 converts the first current signal IAD to a second current signal IDD, which is a digital signal, and provides the second current signal IDD to the control signal generator 340. The second current signal IDD may include a plurality of bits and may represent difference between the charging current Ich and the available maximum current Imav. The control signal generator 340 determines levels of the first through third control signals CS1, CS2, and CS3 to be provided to the charging unit 200, based on the second current signal IDD and the second voltage signal CSN. That is, the control signal generator 340 may determine levels of the first and second control signals CS1 and CS2 according to the difference between the available maximum current Imav and the charging current Ich that has a level corresponding to the bits of the second current signal IDD, and may determine a level of the third control signal CS3 according to the SOC of the rechargeable battery 401 indicated by the second voltage signal CSN. The first control signal CS1 may include a plurality of first control signals CS11, CS12, and CS13. When the second voltage signal CSN indicates that the SOC of the rechargeable battery 401 is 100%, the control signal generator 340 deactivates the third control signal CS3 and provides the switch 230 with the third control signal CS3 having a low level.

For example, when the second current signal IDD indicates that the charging current Ich is substantially the same as the available maximum current Imav, the level of the charging current Ich needs to be decreased such that the lithium plating phenomenon is prevented from occurring at the negative electrode 407 of the rechargeable battery 401. In this case, the control signal generator 340 may decrease the level of the charging current Ich provided to the rechargeable battery 401 by lowering a level of the first control signal CS1 or one or more of the first control signals CS11, CS12, and CS13.

FIG. 10 illustrates the look-up table of FIG. 9.

Referring to FIG. 10, the look-up table 350 includes first through third columns 351, 352, and 353. The first column 351 includes as an entry the second voltage signal CSN, which indicates present battery voltage of the rechargeable battery 401, and the temperature signal THM, which indicates the temperature of the rechargeable battery 401. The second column 352 includes as an entry the current SOC of the rechargeable battery 401, which is knowable by the second voltage signal CSN. The third column 353 includes as an entry the available maximum current Imav, which is knowable by the second voltage signal CSN and the temperature signal THM.

When the second voltage signal CSN detected by the sensing unit 110 corresponds to a second voltage signal CSN2 and the temperature signal THM detected by the temperature sensor 130 corresponds to a temperature signal THM2, the SOC of the rechargeable battery 401 is SOC2 and the available maximum current Imav is Imav2. Therefore, when the second voltage signal CSN and the temperature signal THM are input to the look-up table 350 at the same time, the look-up table 350 provides the operational amplifier 320 with the corresponding available maximum current Imav. Contents to be stored in the look-up table 350 are written in the look-up table 350 in advance through testing. With respect to the second voltage signal CSN and the temperature signal THM, which are not written in the look-up table 350, the available maximum current Imav may be calculated by interpolating between neighboring second voltage signals CSN and temperature signals THM.

Figure 11:
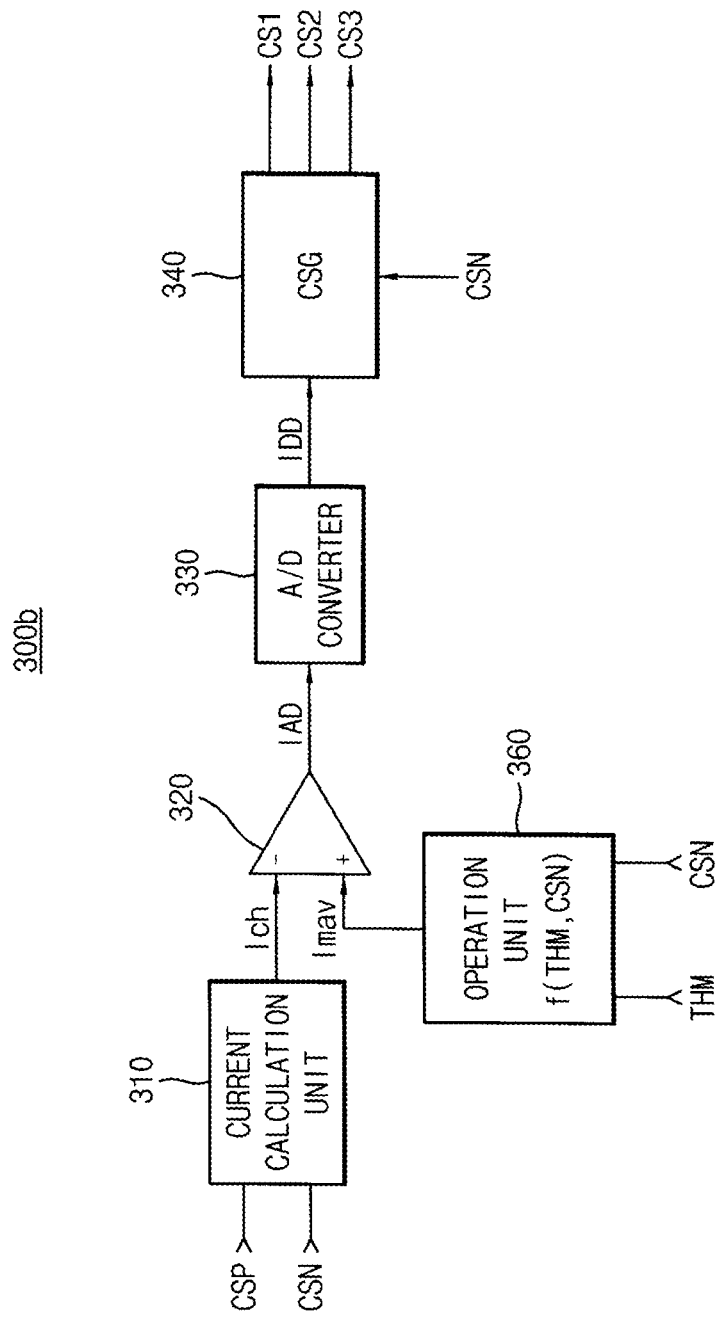
FIG. 11 is a block diagram illustrating an example of the controller of FIG. 1 according to some example embodiments.

FIG. 11 is a block diagram illustrating an example of the controller of FIG. 1 according to some example embodiments.

Referring to FIG. 11, a controller 300b includes a current calculation unit 310, an operational amplifier 320, an analog-to-digital converter (ADC) 330, a control signal generator (CSG) 340, and an operation unit 360.

The controller 300b of FIG. 11 differs from the controller 300a of FIG. 9 in that the controller 300b includes the operation unit 360 instead of the look-up table 350. Therefore, the operation unit 360 is described below.

The operation unit 360 receives the temperature signal THM, which indicates the temperature or the ambient temperature of the rechargeable battery 401, and the second voltage signal CSN, which indicates the battery voltage of the rechargeable battery 401, and provides to the operational amplifier 320 with the available maximum current Imav corresponding to the temperature signal THM and the second voltage signal CSN. The operation unit 360 may store a function f(THM, CSN) whose input is the temperature signal THM and the second voltage signal CSN and whose output is the available maximum current Imav. The function f(THM, CSN) may calculate the available maximum current Imav in response to the temperature signal THM and the second voltage signal CSN, and may provide the available maximum current Imav to the operational amplifier 320.

Figure 12:
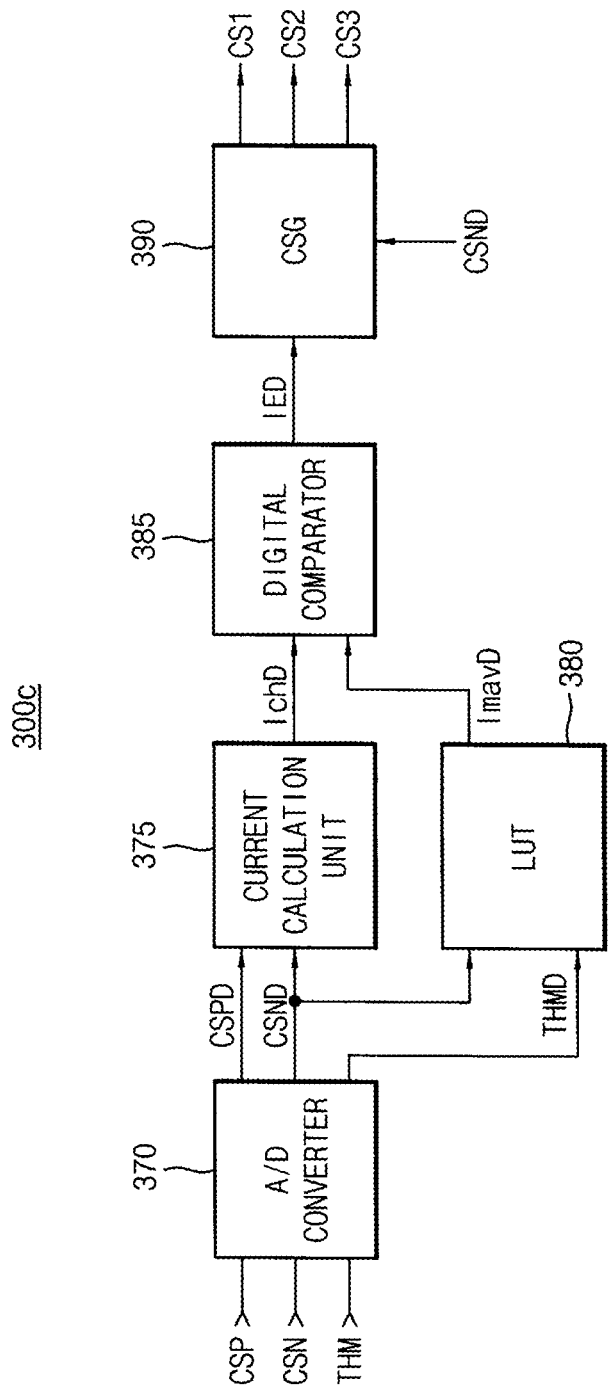
FIG. 12 is a block diagram illustrating an example of the controller of FIG. 1 according to some example embodiments.

FIG. 12 is a block diagram illustrating an example of the controller of FIG. 1 according to some example embodiments.

Referring to FIG. 12, a controller 300c includes an ADC 370, a current calculation unit 375, a look-up table (LUT) 380, a digital comparator 385, and a control signal generator (CSG) 390.

The ADC 370 receives the first and second voltage signals CSP and CSN and the temperature signal THM, and converts the first and second voltage signals CSP and CSN and the temperature signal THM to corresponding digital signals. That is, the ADC 370 converts the first and second voltage signals CSP and CSN to first and second digital voltage signals CSPD and CSND, and converts the temperature signal THM to a digital temperature signal THMD. The ADC 370 provides the first and second digital voltage signals CSPD and CSND to the current calculation unit 375 and provides the second digital voltage signal CSND and the digital temperature signal THMD to the look-up table 380. The resistance of the resistor 111 is stored in the current calculation unit 375 in advance.

The current calculation unit 375 calculates a digital charging current IchD, corresponding to the charging current Ich based on the first and second digital voltage signals CSPD and CSND and the resistance of the resistor 111, and provides the digital charging current IchD to the digital comparator 385. The digital comparator 385 compares the digital charging current IchD and an available digital maximum current ImavD stored in the look-up table 380 and provides the control signal generator 390 with a digital current signal IED corresponding to difference between the digital charging current IchD and available digital maximum current ImavD. The look-up table 380 receives the digital temperature signal THMD and the second digital voltage signal CSND provides the available digital maximum current ImavD corresponding to the digital temperature signal THMD and the second digital voltage signal CSND.

The digital current signal IED may include a plurality of bits and may represent a difference between the digital charging current IchD and the available digital maximum current ImavD. The control signal generator 390 determines levels of the first through third control signals CS1, CS2, and CS3 to be provided to the charging unit 200, based on the digital current signal IED and the second digital voltage signal CSND. That is, the control signal generator 390 may determine levels of the first and second control signals CS1 and CS2 according to the difference between the available digital maximum current ImavD and the digital charging current IchD that has a level corresponding to the bits of the digital current signal IED, and may determine level of the third control signal CS3 according to the SOC of the rechargeable battery 401 indicated by the second digital voltage signal CSND. The first control signal CS1 may include a plurality of first control signals CS11, CS12, and CS13. When the second digital voltage signal CSND indicates that the SOC of the rechargeable battery 401 is 100%, the control signal generator 390 may deactivate the third control signal CS3, and may provide the switch 230 with the third control signal CS3 having a low level.

Figure 13:
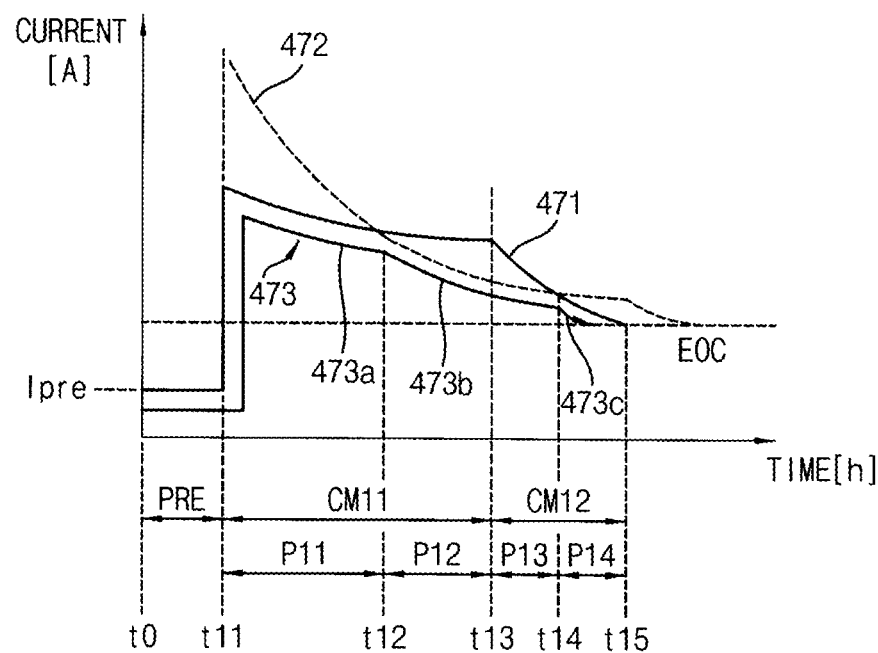
FIG. 13 is a graph illustrating current characteristics according to charging operation of the charging circuit of FIG. 1.

FIG. 13 is a graph illustrating current characteristics according to charging operation of the charging circuit of FIG. 1.

In FIG. 13, a reference numeral 471 represents a current profile when the charging circuit 10 of FIG. 1 charges the rechargeable battery 401 in a constant power mode CP and a constant voltage mode CV, and a reference numeral 472 represents a current profile of the available maximum current Imav indicating maximum charging current when the lithium plating phenomenon does not occur at the negative electrode 407 of the rechargeable battery 401. In addition, a reference numeral 473 represents a current profile of the charging current Ich provided to the rechargeable battery 401 in the charging circuit 10 according to some example embodiments.

Hereinafter, operation of the charging circuit 10 of FIG. 1 will be described with reference to FIGS. 1 through 13.

The charging circuit 10 begins charging the rechargeable battery 401 by providing the rechargeable battery 401 with a preliminary charging current Ipre as the charging current Ich in a preliminary charging mode PRE between times t0 and t11. The preliminary charging current Ipre may have a level of 0.2 C.

In some example embodiments, a current value at which a fully charged rechargeable battery 401 can be discharged to the state of charge (SOC) of 0% in one hour is taken as 1 C (amps). In FIG. 13, current is given in amps (A) and times are given in hours (h).

After the preliminary charging mode PRE, the charging circuit 10 provides the rechargeable battery 401 with the charging current Ich in first and second charging modes CM11 and CM12. The first charging mode CM11 may be divided into first and second periods P11 and P12, and the second charging mode CM12 may be divided into third and fourth periods P13 and P14. The first and second periods P11 and P12 may be divided based on a point where the charging current Ich in the constant power mode CP is the same as the available maximum current Imav, and the third and fourth periods P13 and P14 may be divided based on a point where the charging current Ich in the constant voltage mode CV is the same as the available maximum current Imav. In the CP mode, the charging current Ich multiplied by the battery voltage has a constant value. In the CV mode, the battery voltage has a fixed value.

The controller 300 controls the charging unit 200 such that the charging unit 200 provides the rechargeable battery 401 with a first charging current 473a, following a current profile of a constant power mode CP (a first current profile) as the charging current Ich in the first period P11 between times t11 and t12 of the first charging mode CM11. That is, in the first period P11, the charging current in the CP mode is provided to the rechargeable battery 401. The controller 300 periodically compares the available maximum current Imav with the charging current Ich provided to the rechargeable battery 401, and adjusts the level of the charging current Ich such that the lithium plating phenomenon does not occur due to the charging current Ich at the negative electrode 407 of the rechargeable battery 401 after the time t12 when the charging current Ich following the first current profile is substantially the same as the available maximum current Imav.

The controller 300 controls the charging unit 200 such that the charging unit 200 provides the rechargeable battery 401 with a second charging current 473b that is smaller than the first current profile in the second period P12 between times t12 and t13 of the first charging mode CM11.

For example, when the charging current Ich following the first current profile is continuously provided to the rechargeable battery 401 in the second period P12 between times t12 and t13 of the first charging mode CM11, the lithium plating phenomenon may occur at the negative electrode 407 of the rechargeable battery 401, as described with reference to FIG. 3. When the lithium plating phenomenon occurs on the interface between the negative electrode 407 and the electrolyte 411, lithium ions are lost due to the lithium ions accumulated on the interface between the negative electrode 407 and the electrolyte 411, and a solid-electrolyte interphase layer (SEL) grows on the interface between the negative electrode 407 and the electrolyte 411. Therefore, impedance on the interface between the negative electrode 407 and the electrolyte 411 increases and a lifespan of the rechargeable battery 401 may be degraded.

When the first charging mode CM11 ends at time t13, the charging mode of the charging circuit 10 transits from the first charging mode CM11 to the second charging mode CM12.

The controller 300 controls the charging unit 200 such that the charging unit 200 provides the rechargeable battery 401 with the second charging current 473b in the third period P13 between times t13 and t14 of the second charging mode CM12. The controller 300 periodically compares a current profile in the CV mode (a second current profile) with the charging current Ich provided to the rechargeable battery 401, and adjusts the level of the charging current Ich such that the lithium plating phenomenon does not occur due to the charging current Ich at the negative electrode 407 of the rechargeable battery 401 after the time t14 when the second current profile is substantially the same as the charging current Ich. The controller 300 controls the charging unit 200 such that the charging unit 200 provides the rechargeable battery 401 with a third charging current 473c following the second current profile as the charging current Ich in the fourth period P14 between times t14 and t15 of the second charging mode CM12. Charging the rechargeable battery 401 is complete at time t15.

For example, when the rechargeable battery 401 is charged according to CP-CV mode as the reference numeral 471 indicates, a longer time (after time t15) may be required for fully charging the rechargeable battery 401, and the lithium plating phenomenon may occur at the negative electrode 407 of the rechargeable battery 401. Therefore, a lifespan of the rechargeable battery 401 may be degraded. However, according to some example embodiments of the present inventive concepts, the rechargeable battery 401 is charged by providing the rechargeable battery 401 with the charging current Ich following a current profile of the constant power mode CP at an initial charging stage, and adjusting the level of the charging current Ich such that the lithium plating phenomenon does not occur at the negative electrode 407 of the rechargeable battery 401. Therefore, the charging circuit 10 may rapidly charge the rechargeable battery 401 while preventing degradation of the lifespan of the rechargeable battery 401.

Figure 14:
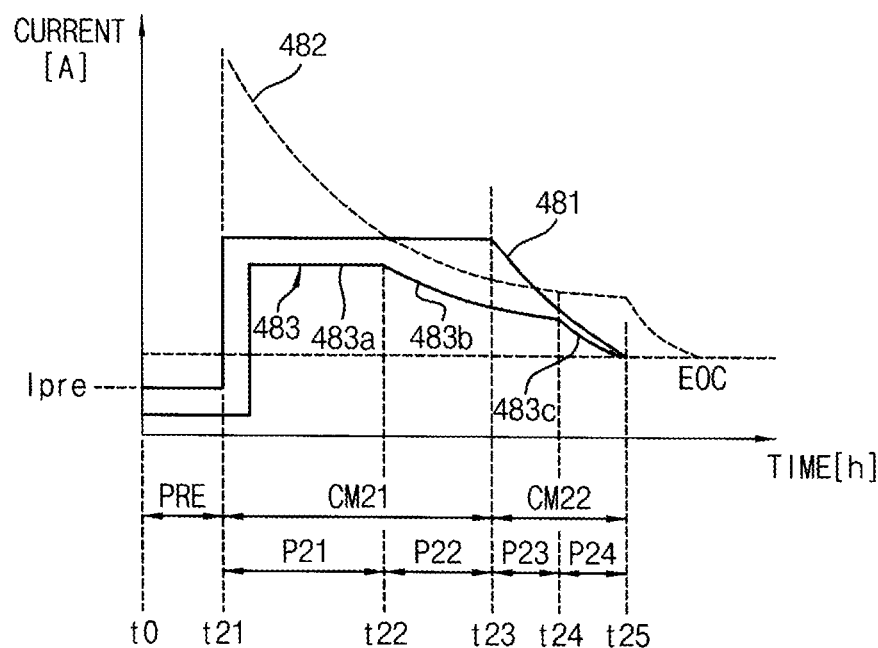
FIG. 14 is a graph illustrating current characteristics according to charging operation of the charging circuit of FIG. 1.

FIG. 14 is a graph illustrating current characteristics according to charging operation of the charging circuit of FIG. 1.

In FIG. 14, a reference numeral 481 represents a current profile when the charging circuit 10 of FIG. 1 charges the rechargeable battery 401 in a constant current mode CC and a constant voltage mode CV, and a reference numeral 482 represents a current profile of the available maximum current Imav indicating maximum charging current when the lithium plating phenomenon does not occur at the negative electrode 407 of the rechargeable battery 401. In addition, a reference numeral 483 represents a current profile of the charging current Ich provided to the rechargeable battery 401 in the charging circuit 10 according to some example embodiments. In the CC mode, the charging current Ich has a fixed value.

Hereinafter, operation of the charging circuit 10 of FIG. 1 will be described with reference to FIGS. 1 through 12 and 14.

The charging circuit 10 begins charging the rechargeable battery 401 by providing the rechargeable battery 401 with a preliminary charging current Ipre as the charging current Ich in a preliminary charging mode PRE between times t0 and t21. The preliminary charging current Ipre may have a level of 0.2 C.

In some example embodiments, a current value at which a fully charged rechargeable battery 401 can be discharged to the state of charge (SOC) of 0% in one hour is taken as 1 C (amps). In FIG. 14, current is given in amps (A) and times are given in hours (h).

After the preliminary charging mode PRE, the charging circuit 10 provides the rechargeable battery 401 with the charging current Ich in first and second charging modes CM21 and CM22. The first charging mode CM21 may be divided into first and second periods P21 and P22, and the second charging mode CM22 may be divided into third and fourth periods P23 and P24. The first and second periods P21 and P22 may be divided based on a point where the charging current Ich in the constant current mode CC is the same as the available maximum current Imav, and the third and fourth periods P23 and P24 may be divided based on a point where the charging current Ich in the constant voltage mode CV is the same as the available maximum current Imav.

The controller 300 controls the charging unit 200 such that the charging unit 200 provides the rechargeable battery 401 with a first charging current 483*a* following a current profile of a constant current mode CC (a first current profile) as the charging current Ich in the first period P21 between times t21 and t22 of the first charging mode CM21. That is, in the first period P21, the charging current in the CC mode is provided to the rechargeable battery 401. The controller 300 periodically compares the available maximum current Imav with the charging current Ich provided to the rechargeable battery 401, and adjusts the level of the charging current Ich such that the lithium plating phenomenon does not occur due to the charging current Ich at the negative electrode 407 of the rechargeable battery 401 after the time t22 when the charging current Ich following the first current profile is substantially the same as the available maximum current Imav.

The controller 300 controls the charging unit 200 such that the charging unit 200 provides the rechargeable battery 401 with a second charging current 483*b* that is smaller than the first current profile in the second period P22 between times t22 and t23 of the first charging mode CM21.

For example, when the charging current Ich following the first current profile is continuously provided to the rechargeable battery 401 in the second period P22 between times t22 and t23 of the first charging mode CM21, the lithium plating phenomenon may occur at the negative electrode 407 of the rechargeable battery 401, as described with reference to FIG. 3. When the lithium plating phenomenon occurs on the interface between the negative electrode 407 and the electrolyte 411, lithium ions are lost due to the lithium ions accumulated on the interface between the negative electrode 407 and the electrolyte 411, and a solid-electrolyte interphase layer (SEL) grows on the interface between the negative electrode 407 and the electrolyte 411. Therefore, impedance on the interface between the negative electrode 407 and the electrolyte 411 increases and a lifespan of the rechargeable battery 401 may be degraded.

When the first charging mode CM21 ends at time t23, the charging mode of the charging circuit 10 transits from the first charging mode CM21 to the second charging mode CM22.

The controller 300 controls the charging unit 200 such that the charging unit 200 provides the rechargeable battery 401 with the second charging current 483*b* in the third period P23 between times t23 and t24 of the second charging mode CM22. The controller 300 periodically compares a current profile in the CV mode (a second current profile) with the charging current Ich provided to the rechargeable battery 401, and adjusts the level of the charging current Ich such that the lithium plating phenomenon does not occur due to the charging current Ich at the negative electrode 407 of the rechargeable battery 401 after the time t24 when the second current profile is substantially the same as the charging current Ich. The controller 300 controls the charging unit 200 such that the charging unit 200 provides the rechargeable battery 401 with a third charging current 483*c* following the second current profile as the charging current Ich in the fourth period P24 between times t24 and t25 of the second charging mode CM22. Charging the rechargeable battery 401 is complete at time t25.

For example, when the rechargeable battery 401 is charged according to CC-CV mode as the reference numeral 481 indicates, a longer time (after time t25) may be required for fully charging the rechargeable battery 401, and the lithium plating phenomenon may occur at the negative electrode 407 of the rechargeable battery 401. Therefore, a lifespan of the rechargeable battery 401 may be degraded. However, according to some example embodiments of the present inventive concepts, the rechargeable battery 401 is charged by providing the rechargeable battery 401 with the charging current Ich following a current profile of the constant current mode CC at an initial charging stage, and adjusting the level of the charging current Ich such that the lithium plating phenomenon does not occur at the negative electrode 407 of the rechargeable battery 401. Therefore, the charging circuit 10 may rapidly charge the rechargeable battery 401 while preventing degradation of the lifespan of the rechargeable battery 401.

Figure 15:
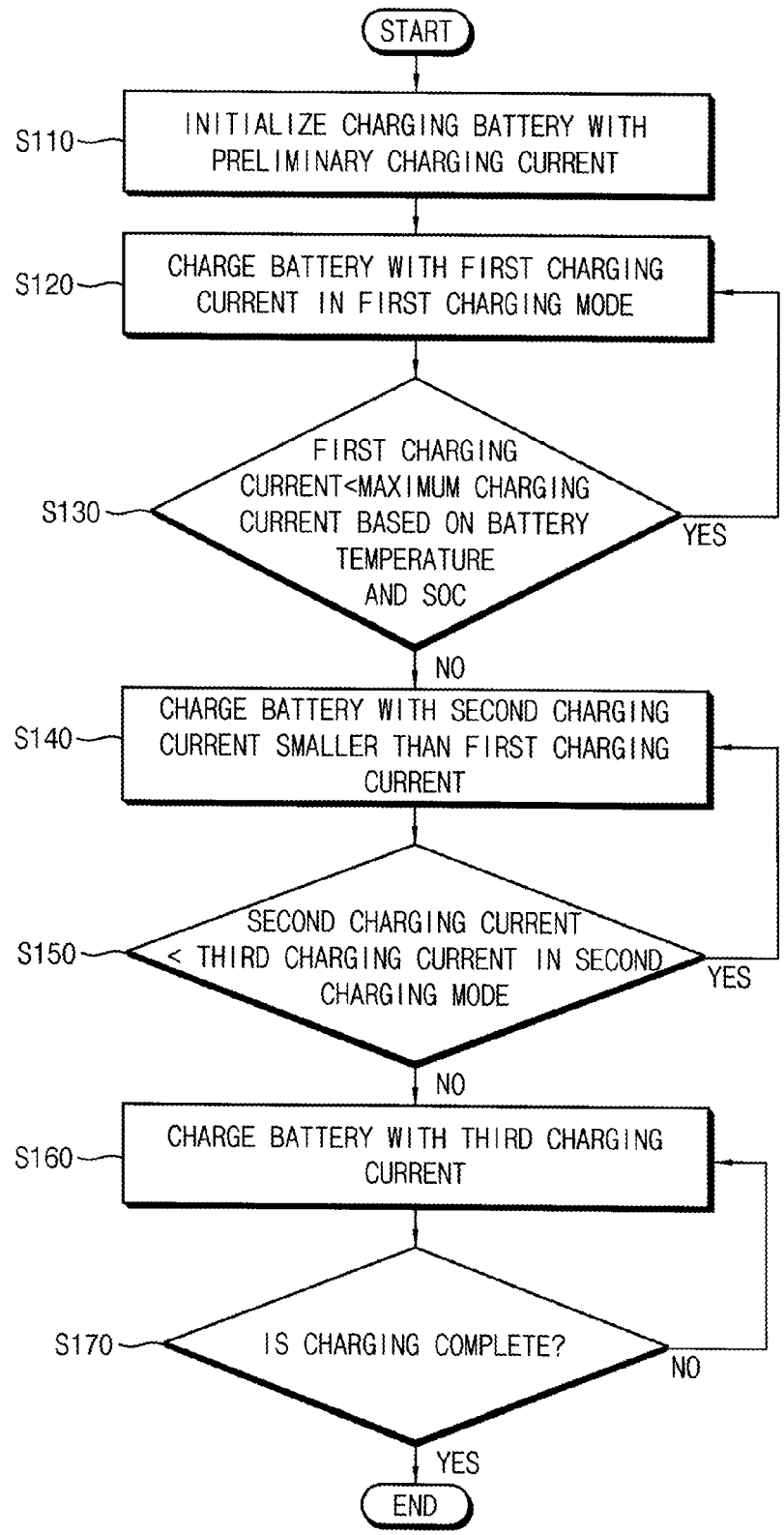
FIG. 15 is a flow chart illustrating a method of charging a rechargeable battery according to some example embodiments.

FIG. 15 is a flow chart illustrating a method of charging a rechargeable battery 401 according to some example embodiments.

Hereinafter, there will be description on a method of charging a rechargeable battery 401 with reference to FIGS. 1 through 4 and 13 through 15.

Charging operation is initialized by providing the rechargeable battery 401 with a preliminary charging current Ipre as the charging current Ich (S110). The rechargeable battery 401 may be a lithium ion secondary battery. The rechargeable battery 401 is charged with a first charging current 473*a* or 483*a* in the first charging mode CM11 or CM21 (S120). The first charging current may be the charging current 473*a* following a current profile in the constant power mode CP or may be the charging current 483*a* following a current profile in the constant current mode CC.

The controller 300 periodically determines whether the first charging current 473*a* or 483*a* is smaller than the available maximum current Imav by comparing the first charging current 473*a* or 483*a* and the available maximum current Imav based on the temperature and the SOC of the rechargeable battery 401 (S130). When the first charging current 473*a* or 483*a* is smaller than the available maximum current Imav (YES in S130), the charging unit 200 charges the rechargeable battery 401 with the first charging current 473*a* or 483*a* (S120). In some example embodiments, the available maximum current Imav is a maximum current value that prevents the lithium plating phenomenon from occurring at the negative electrode 407 of the rechargeable battery 401. When the first charging current 473*a* or 483*a* is not smaller than the available maximum current Imav (NO in S130), the controller 300 controls the charging unit 200 such that the second charging current 473*b* or 483*b* smaller than the first charging current is provided to the rechargeable battery 401 (S140).

The charging mode of the charging circuit 200 transitions to the second charging mode CM12 or CM22, the controller 300 periodically determines whether the second charging current 473b or 483b is smaller than a third charging current 473c or 483c following a current profile of the second charging mode (S150). In some example embodiments, the third charging current 473c or 483c may be a charging current following a current profile of the constant voltage mode CV. When the second charging current 473b or 483b is smaller than the third charging current 473c or 483c (YES in S150), the charging unit 200 charges the rechargeable battery 401 with the second charging current 473b or 483b (S140). When the second charging current 473b or 483b is not smaller than the third charging current 473c or 483c (NO in S150), the controller 300 controls the charging unit 200 such that the third charging current 473c or 483c is provided to the rechargeable battery 401 (S160). It is determined whether the rechargeable battery 401 is fully charged (S170). When the rechargeable battery 401 is not fully charged, the rechargeable battery 401 is charged with third charging current 473c or 483c. When the rechargeable battery 401 is fully charged, the charging operation is complete.

Accordingly, the rechargeable battery 401 is charged by providing the rechargeable battery 401 with the charging current Ich following a current profile of the constant power mode CP or the constant current mode CC at an initial charging stage, and adjusting the level of the charging current Ich such that the lithium plating phenomenon does not occur at the negative electrode 407 of the rechargeable battery 401 according to the method of charging the rechargeable battery 401. Therefore, the charging circuit 10 may rapidly charge the rechargeable battery 401 while preventing degradation of the lifespan of the rechargeable battery 401.

Figure 16:
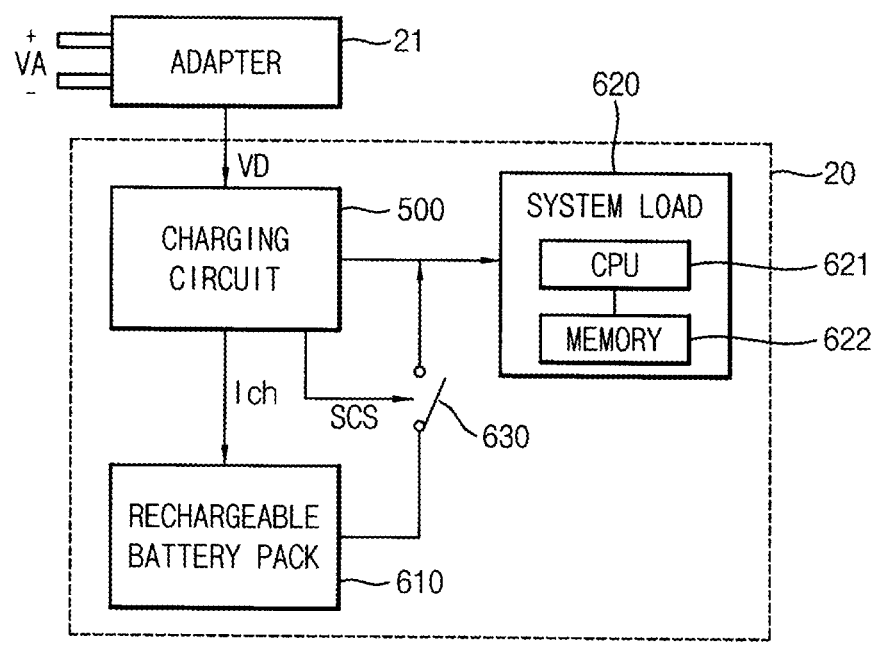
FIG. 16 is a block diagram illustrating a charging system according to some example embodiments.

FIG. 16 is a block diagram illustrating a charging system according to some example embodiments.

Referring to FIG. 16, a charging system 15 includes an adapter 21 and an electronic device 20 electrically coupled to the adapter 21. The electronic device 20 may be, for instance, a smartphone, notebook, tablet, netbook computing devices, or the like, which has a central processing unit (CPU) 621 and a memory 622 that require operating power. The CPU 621 and the memory 622 are part of a system load 620 for which the operating power is needed. The electronic device 20 may further include a charging circuit 500, a rechargeable battery pack 610, and a switch 630.

The adapter 21 converts an AC voltage VA from an AC outlet to a DC voltage VD to supply the DC voltage VD to the charging circuit 500. The charging circuit 500 generates a charging current Ich based on the DC voltage VD and charges the rechargeable battery pack 610 by providing the charging current Ich to the rechargeable battery pack 610. In addition, the charging circuit 500 may adjust a level of the charging current Ich such that the lithium plating phenomenon does not occur at a negative electrode of the rechargeable battery pack 610 while charging the rechargeable battery pack 610.

The switch 630 connects the rechargeable battery pack 610 to the system load 620 when the charging circuit 500 is not connected to the adapter 21. When the adapter 21 is connected to the charging circuit 500, the switch 630 is opened to disconnect the rechargeable battery pack 610 from system load 620 so that system load 620 is powered by the adapter 21 directly.

The rechargeable battery pack 610 can supply additional power to the system load 620 when the capabilities of the adapter 21 are exceeded. More specifically, when the power required by the system load 620 is more than the adapter 21 can provide, the charging circuit 500 may apply a switching control signal SCS to connect the rechargeable battery pack 610 to the system load 620. In addition, when the power required by the system load 620 is not more than the adapter 21 can provide, the charging circuit 500 may apply the switching control signal SCS to disconnect the rechargeable battery pack 610 from the system load 620. The rechargeable battery pack 610 may employ the rechargeable battery 401 of FIG. 2. That is, the rechargeable battery pack 610 may be a lithium ion secondary battery.

Figure 17:
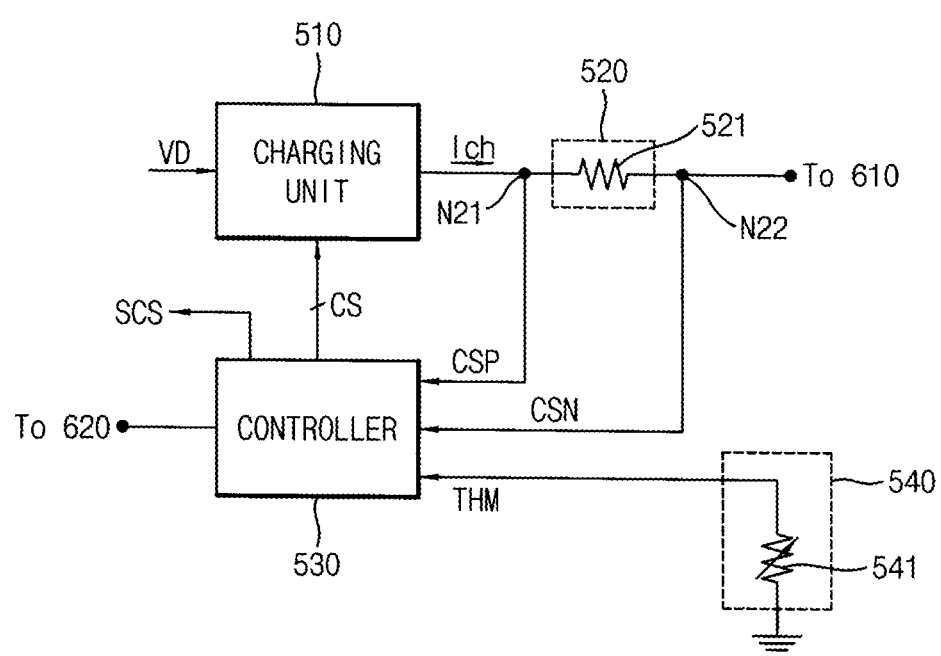
FIG. 17 is a block diagram illustrating the charging circuit of FIG. 16 according to some example embodiments.

FIG. 17 is a block diagram illustrating the charging circuit 500 of FIG. 16 according to some example embodiments.

Referring to FIG. 17, the charging circuit 500 includes a charging unit 510, a sensing unit 520, a controller 530, and a temperature sensor 540. The sensing unit 520 may be implemented by a resistor 521, and the temperature sensor 540 may be implemented by a thermistor 541 that has a negative temperature coefficient.

The charging unit 510 receives the DC voltage VD, generates a charging current Ich based on the DC voltage VD, and provides the charging current Ich to the rechargeable battery pack 610. The sensing unit 520 may include the resistor 521, and the sensing unit 520 may be connected to first and second nodes N21 and N22 between the charging unit 510 and the rechargeable battery pack 610. The sensing unit 520 provides a first voltage signal CSP at the first node N21 and provides a second voltage signal CSN at the second node N22. The resistance of the resistor 521 is a desired value (that may or may not be predetermined), and a level of the charging current Ich may be calculated based on the resistance of the resistor 521 and the first and second voltage signals CSP and CSN (e.g., voltages at the two ends of the resistor 521).

The temperature sensor 540 is arranged close to the rechargeable battery pack 610, senses a temperature or an ambient temperature of the rechargeable battery pack 610, and provides a temperature signal THM to the controller 530. The temperature sensor 540 may include the thermistor 541 that has a negative temperature coefficient (NTC). The thermistor 541 is a resistor whose resistance varies according to a change in the temperature. An NTC thermistor has a resistance that decreases with an increase in temperature. However, the temperature sensor 540 is not limited to the NTC thermistor 541.

The controller 530 receives the first and second voltage signals CSP and CSN and the temperature signal THM, and calculates the level (or magnitude) of the charging current Ich based on the first and second voltage signals CSP and CSN. The second voltage signal CSN is a voltage applied to a positive electrode of the rechargeable battery pack 610, and the second voltage signal CSN may indicate a battery voltage of the rechargeable battery pack 610. Therefore, the controller 530 may control the charging unit 510 according to a charging mode based on the first and second voltage signals CSP and CSN and the temperature signal THM such that a lithium plating phenomenon does not occur at a negative electrode of the rechargeable battery pack 610 due to the charging current Ich. That is, the controller 530 may control the charging unit 510 via control signal(s) CS according to a charging mode based on the first and second voltage signals CSP and CSN and the temperature signal THM such that a level of the charging current Ich is adjusted.

In addition, the controller 530 is also connected to the system load 620, and determines whether the power required by the system load 620 is more than the adapter 21 can provide. The charging circuit 500 may apply the switching control signal SCS to connect the rechargeable battery pack 610 to the system load 620 when the power required by the system load 620 is more than the adapter 21 can provide.

The controller 530 may employ one of the controller 300a of FIG. 9, the controller 300b of FIG. 11, or the controller 300c of FIG. 12. In this case, the controller 530 may include a logic or a circuit that compares the power required by the system load 620 and a power which the adapter 21 can provide, and may provide the comparison result to the control signal generator 340 or 390. The control signal generator 340 or 390 may determine a logic level of the switching control signal SCS based on the comparison result to provide the switching control signal SCS to the switch 630.

Figure 18:
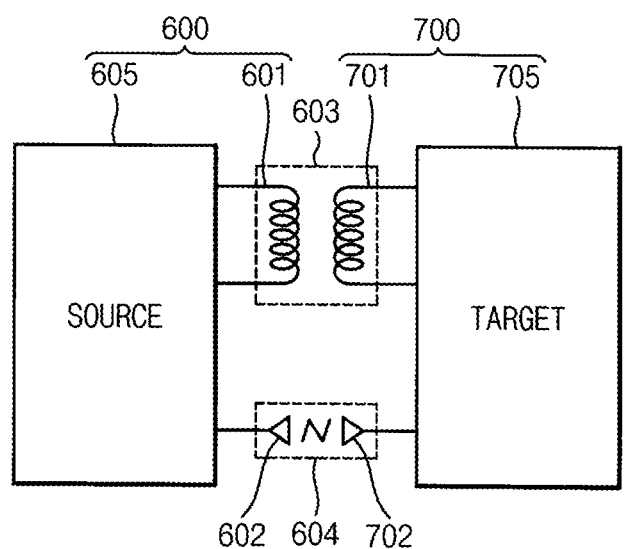
FIG. 18 is a block diagram illustrating a wireless power transmission system capable of employing the charging circuit according to some example embodiments.

FIG. 18 is a block diagram illustrating a wireless power transmission system capable of employing the charging circuit according to some example embodiments.

Wireless power refers to energy transferred from a wireless power transmission apparatus to a wireless power reception apparatus via magnetic coupling. A method of transmitting wireless power has been provided for a number of products, ranging from an electric vehicle transmitting power greater than or equal to a few kilowatts (kW), to a high power application consuming power greater than or equal to 100 W, and to a low power application consuming power less than or equal to 10 W. The low power application may be used, for example, in a mobile device.

A wireless power reception device may charge a battery using received energy. A wireless power transmission and charging system includes a source device and a target device. The source device wirelessly transmits power. On the other hand, the target device wirelessly receives power. In other words, the source device may be referred to as a wireless power transmission apparatus, and the target device may be referred to as a wireless power reception apparatus.

In some example embodiments, resonance-type wireless power transmission may provide a high degree of freedom in terms of positions of a source device and a target device. The source device includes a source resonator, and the target device includes a target resonator. Magnetic coupling or resonance coupling may be formed between the source resonator and the target resonator. The source device and the target device may communicate with each other. During communications, the transmission or reception of control and state information may occur.

Referring to FIG. 18, a wireless power transmission system 30 includes a source device (e.g., wireless power transmission device) 600 and a target device (e.g., wireless power reception device) 700. The source device 600 may be any of various devices that supply power, such as pads, terminals, televisions (TVs), and any other device that supplies power. The target device 700 may be any of various devices that consume power, such as terminals, TVs, vehicles, washing machines, radios, lighting systems, and any other device that consumes power.

The source device 600 may include a source 605, a source resonator 601, and an antenna 602, and the target device 700 may include a target 705, a target resonator 701, and an antenna 702.

The source resonator 601 may transmit electromagnetic energy 603 to the target resonator 701. For example, the source resonator 601 may transfer the electromagnetic energy 603, such as communication power or charging power, to the target resonator 701 via a magnetic coupling (or a magnetic resonance) with the target resonator 701. The communication power may be, for example, a low power of 0.1 milliwatts (mW) to 1 mW, and the charging power may be, for example, a high power of 1 mW to 200 Watts (W) that may be consumed by a device load of the target device 700. In this description, the term "charging" may refer to supplying power to an element or a unit that charges a battery or other rechargeable device with power. Also, the term "charging" may refer supplying power to an element or a unit that consumes power. For example, the term "charging power" may refer to power consumed by a target device while operating and/or power used to charge a battery of the target device. The unit or the element may include, for example, a battery, a display device, a sound output circuit, a main processor, and various types of sensors. The high power of 1 mW to 200 Watts (W) may be used for operating and charging an electric vehicle and a mobile terminal.

The source 605 may provide the target 605 with various data 604 via the antenna 602, and the target 705 may receive the various data 604 via the antenna 702 from the source 605. The source 605 and the target 705 may perform out-of-band communication using the antennas 602 and 702.

Figure 19:
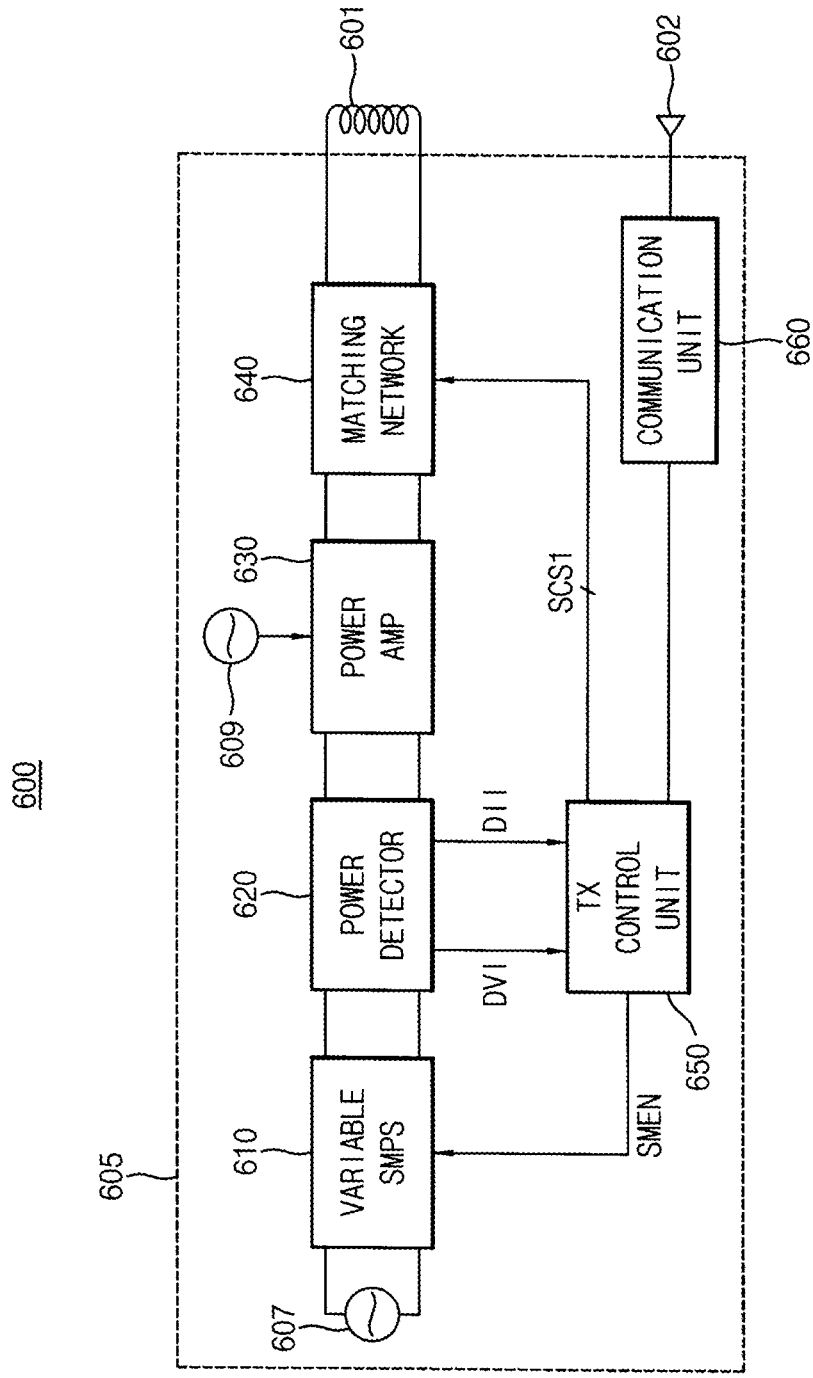
FIG. 19 is a block diagram illustrating the source device of FIG. 18 according to some example embodiments.

FIG. 19 is a block diagram illustrating the source device of FIG. 18 according to some example embodiments.

Referring to FIG. 19, the source device 600 includes the source resonator 601, the antenna 602, and the source 605. The source 605 includes a variable switching mode power supply (SMPS) 610, a power detector 620, a power amplifier 630, a matching network 640, a transmission (TX) control unit 650, and a communication unit 660.

The variable SMPS 610 generates a direct current (DC) voltage by switching an alternating current (AC) voltage having a frequency of tens of hertz (Hz) output from a power supply 607. The variable SMPS 610 may output a DC voltage having a desired level (that may or may not be predetermined), or may output a DC voltage having an adjustable level according to control signal SMEN from the TX control unit 650.

The power detector 620 detects an output current and an output voltage of the variable SMPS 610, and provides, to the TX control unit 650, information DVI and DII on the detected current (DII) and the detected voltage (DVI). Additionally, the power detector 620 detects an input current and an input voltage of the power amplifier 630.

The power amplifier 630 generates power by converting the DC voltage output from the variable SMPS 610 to an AC voltage using a switching pulse signal having a frequency of a few kilohertz (kHz) to tens of megahertz (MHz) from an oscillator 609. In other words, the power amplifier 630 converts a DC voltage supplied to the power amplifier 630 to an AC voltage using a reference resonance frequency, and generates communication power to be used for communication and/or charging power to be used for charging that may be used in the target device.

The TX control unit 650 may detect a reflected wave of the communication power or a reflected wave of the charging power, and may detect mismatching between the target resonator 701 and the source resonator 601 based on the detected reflected wave. The TX control unit 650 may detect the mismatching by detecting an envelope of the reflected wave, or by detecting an amount of power of the reflected wave.

Under the control of the TX control unit 650, the matching network 640 compensates for impedance mismatching between the source resonator 601 and the target resonator 701 so that the source resonator 601 and the target resonator 701 are optimally-matched. The matching network 640 includes combinations of capacitor(s) and inductor(s) that are connected to the TX control unit 650 through a switch in response to switching control signals SCS1 from the TX control unit 650.

The TX control unit 650 may calculate a voltage standing wave ratio (VSWR) based on a voltage level of the reflected wave and a level of an output voltage of the source resonator 601 or the power amplifier 630. When the VSWR is greater than a desired value (that may or may not be predetermined), the TX control unit 650 detects the mismatching.

In addition, the TX control unit 650 calculates a power transmission efficiency of each of 'N' desired tracking frequencies (that may or may not be predetermined), determines a tracking frequency having the best power transmission efficiency among the 'N' desired tracking frequencies (that may or may not be predetermined), and changes the reference resonance frequency to the tracking frequency.

In addition, the TX control unit 650 may control a frequency of the switching pulse signal used by the power amplifier 630. By controlling the switching pulse signal used by the power amplifier 630, the TX control unit 650 may generate a modulation signal to be transmitted to the target device 700. For example, the communication unit 660 may transmit various messages to the target device 700 via in-band communication. Additionally, the TX control unit 650 may detect a reflected wave, and may demodulate a signal received from the target device 700 through an envelope of the reflected wave.

The TX control unit 650 may generate a modulation signal for in-band communication using various schemes. For generating a modulation signal, the TX control unit 650 may turn on or off the switching pulse signal used by the power amplifier 630, or may perform delta-sigma modulation. Additionally, the TX control unit 650 may generate a pulse-width modulation (PWM) signal having a desired envelope (that may or may not be predetermined).

The communication unit 660 may perform out-of-band communication using a communication channel. The communication unit 660 may include a communication module, such as a ZigBee module, a Bluetooth module, or any other communication module, that the communication unit 660 may use to perform the out-of-band communication. The communication unit 660 may transmit or receive various data 604 to or from the target device 700 via the out-of-band communication.

Figure 20:
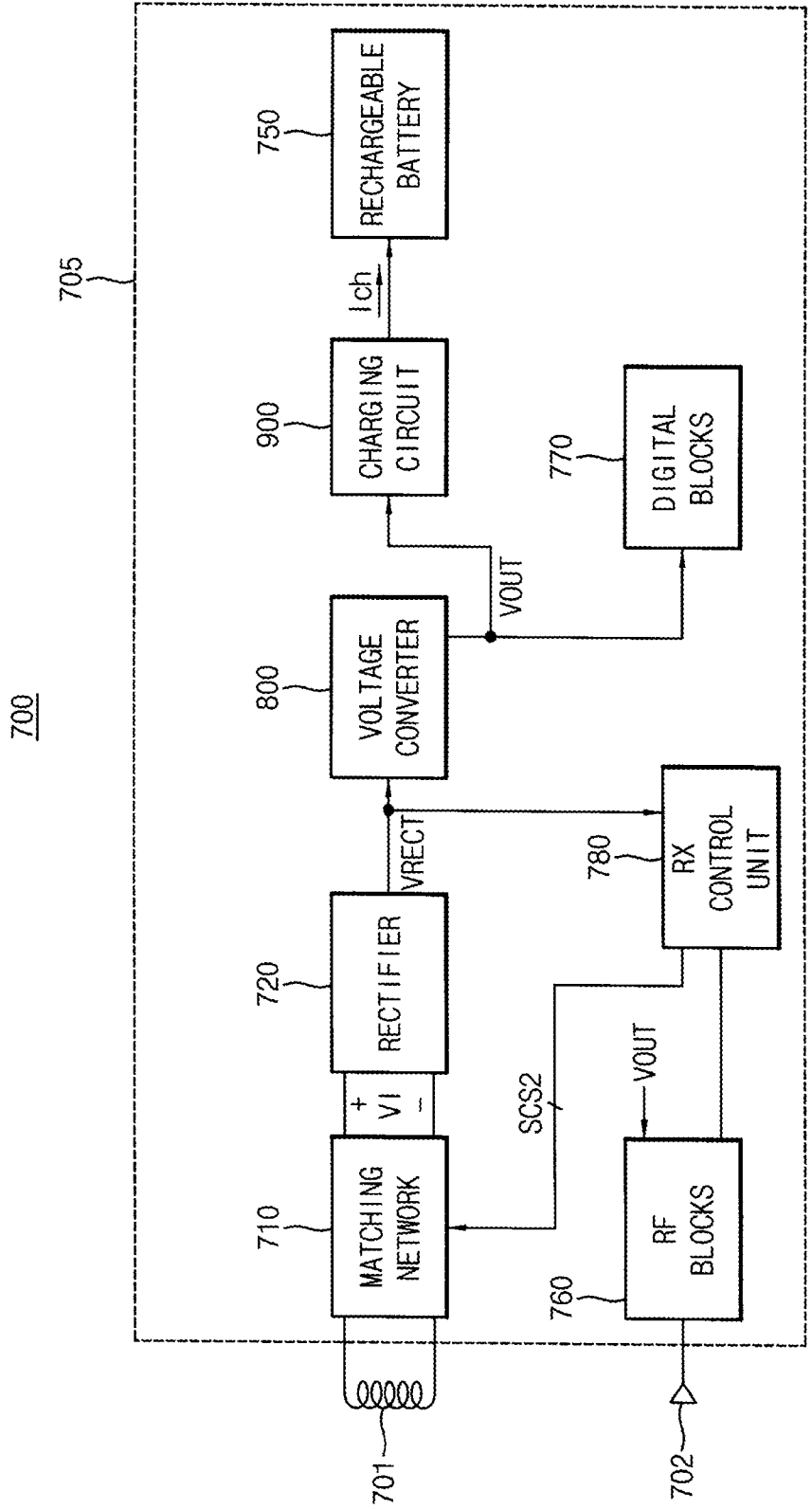
FIG. 20 is a block diagram illustrating the target device of FIG. 18 according to some example embodiments.

FIG. 20 is a block diagram illustrating the target device of FIG. 18 according to some example embodiments.

Referring to FIG. 20, the target device (or the wireless power reception device) 700 includes the target resonator 701, the antenna 702, and the target 705. The target 705 includes a matching network 710, a rectifier 720, a voltage converter 800, a charging circuit 900, a rechargeable battery 750, radio frequency (RF) blocks 760, digital blocks 770, and a reception (RX) control unit 780.

The target resonator 701 receives the electromagnetic energy 603, such as the communication power or the charging power, from the source resonator 601 via magnetic coupling with the source resonator 601. Additionally, the target resonator 701 receives various data 604 from the source 605 via the in-band communication.

The target resonator 701 receives the electromagnetic energy 603 through the magnetic resonance from the source resonator 601 to provide the energy to the matching network 710. Under the control of the RX control unit 780, the matching network 710 compensates for impedance mismatching between the source resonator 601, in response to switching control signals SCS2, and the target resonator 701, and provides the rectifier 720 with an input voltage VI based on the received energy. The matching network 710 includes combinations of capacitor(s) and inductor(s).

The rectifier 720 rectifies the input voltage VI to provide a rectified voltage VRECT to the voltage converter 800. The voltage converter 800 receives the rectified voltage VRECT, and generates output voltages VOUT to the digital blocks 770 and the RF blocks 760 as a charging voltage, respectively.

The RF blocks (or communication unit) 760 may perform in-band communication that transmits and receives data using resonance frequency. The RX control unit 780 demodulates a received signal by detecting a signal between the target resonator 701 and the rectifier 720, or based on the rectified voltage VRECT. In other words, the RX control unit 780 may demodulate a message received via the in-band communication. Additionally, the RX control unit 780 may adjust an impedance of the target resonator 701 to modulate a signal to be transmitted to the source device 600.

The RF blocks 760 may transmit, to the source device 600, any one or any combination of a response message including a product type of a corresponding target device, manufacturer information of the corresponding target device, a product model name of the corresponding target device, a battery type of the corresponding target device, a charging scheme of the corresponding target device, an impedance value of a load of the corresponding target device, information about a characteristic of a target resonator of the corresponding target device, information about a frequency band used the corresponding target device, an amount of power to be used by the corresponding target device, an intrinsic identifier of the corresponding target device, product version information of the corresponding target device, and standards information of the corresponding target device.

The RF blocks 760 may also perform out-of-band communication using a communication channel. The RF blocks 760 may include a communication module, such as a ZigBee module, a Bluetooth module, or any other communication module known in the art, that the RF blocks 760 may use to transmit or receive various data 604 to or from the source device 600 via the out-of-band communication.

The TX control unit 650 of FIG. 19 sets a resonance bandwidth of the source resonator 601. Based on the resonance bandwidth of the source resonator 601, a Q-factor of the source resonator 601 is set. The RX control unit 780 of FIG. 20 sets a resonance bandwidth of the target resonator 701. Based on the resonance bandwidth of the target resonator 701, a Q-factor of the target resonator 701 is set. For example, the resonance bandwidth of the source resonator 601 may be set to be wider or narrower than the resonance bandwidth of the target resonator 701.

Figure 21:
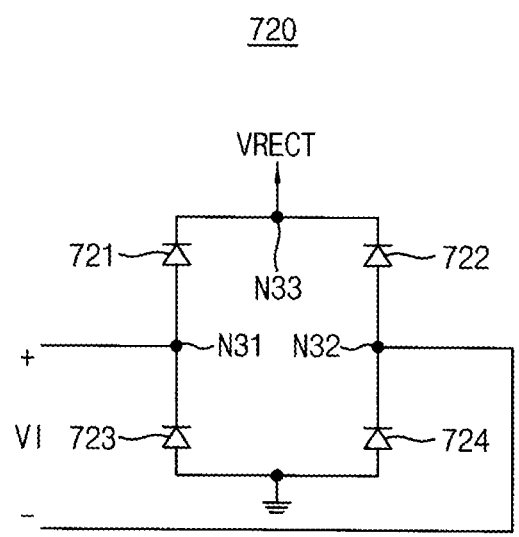
FIG. 21 is a circuit diagram illustrating the rectifier of FIG. 20 according to some example embodiments.

FIG. 21 is a circuit diagram illustrating the rectifier of FIG. 20 according to some example embodiments.

Referring to FIG. 21, the rectifier 720 includes a plurality of diodes 721-724.

The diode 721 is connected to the diode 723 at a node N31 and is connected to the diode 722 at a node N33. The diode 724 is connected to the diode 722 at a node N32, and the diodes 723 and 724 are commonly connected to the ground voltage. The input voltage VI is applied to the nodes N31 and N32, and the rectified voltage VRECT is provided at the node N33. The rectifier 720 rectifies the input voltage VI which is AC voltage to provide the rectified voltage VRECT, which is DC voltage. The nodes N31 and N32 are connected to the matching network 710.

Figure 22:
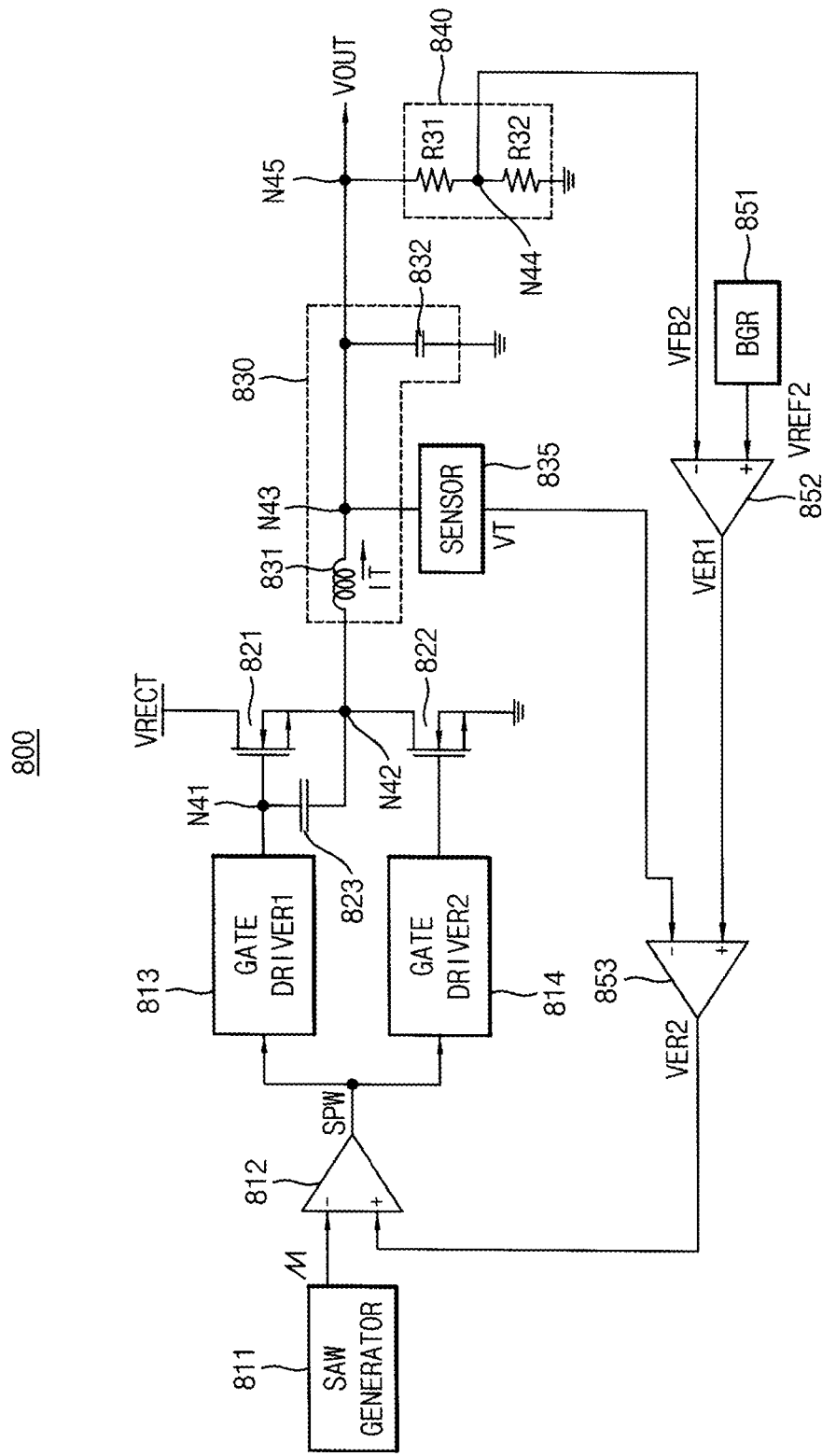
FIG. 22 is a block diagram illustrating the voltage converter of FIG. 20 according to some example embodiments.

FIG. 22 is a block diagram illustrating the voltage converter of FIG. 20 according to some example embodiments.

Referring to FIG. 22, the voltage converter 800 includes a saw-tooth wave generator 811, a pulse-width modulation (PWM) comparator 812, first and second gate drivers 813 and 814, NMOS transistors 821 and 822, a low-pass filter 830, a feedback unit 840, a sensor 835, a reference voltage generator 851 (e.g., a bandgap reference voltage regulator (BGR)), and first and second error amplifiers 852 and 853.

The NMOS transistor 821 includes a drain receiving the rectified voltage VRECT, a gate connected to an output of the first gate driver 813, and a source connected to a node N42. The gate of the NMOS transistor 821 is connected to a first terminal of a capacitor 823 at a node N41 and source of the NMOS transistor 821 is connected to a second terminal of the capacitor 823. The NMOS transistor 822 includes a drain connected to the node N42, a gate connected an output of the second gate driver 814, and a source connected to the ground voltage.

The low-pass filter 830 is connected between the node N42 and a node N45, and includes an inductor 831 connected between the node N42 and a node N43, and a capacitor 832 connected between the node N43 and the ground voltage. The sensor 835 senses a current IT flowing through the inductor 831, and converts the current IT to a voltage VT to be provided to the second error amplifier 853.

The feedback unit 840 includes resistors R31 and R32, which are connected in series between the node N45 and the ground voltage, and the feedback unit 840 provides a feedback voltage VFB2 by dividing an output voltage VOUT at a node N44, where the resistors R31 and R32 are connected to each other.

The first error amplifier 852 amplifies a voltage difference between the reference voltage VREF2 from the reference voltage generator 851 and the feedback voltage VFB2 to output a first error voltage VER1. The second error amplifier 853 amplifies a voltage difference between the first error voltage VER1 and the voltage VT to output a second error voltage VER2.

The PWM comparator 812 compares the second error voltage VER2 and a saw-tooth wave from the saw-tooth wave generator 811 to output a pulse signal SPW having a pulse width corresponding to the voltage difference between the second error voltage VER2 and the saw-tooth wave. The first gate driver 813 drives the first NMOS transistor 821 in response to the pulse signal SPW, and the second gate driver 814 drives the second NMOS transistor 822 in response to the pulse signal SPW. The first and second gate drivers 813 and 814 complementarily operate. For example, when the first gate driver 813 turns-on the first NMOS transistor 821, the second gate driver 814 turns-off the second NMOS transistor 822. For example, when the first gate driver 813 turns-off the first NMOS transistor 821, the second gate driver 814 turns on the second NMOS transistor 822.

The low-pass filter 830 low-pass filters a voltage at the node N42 to provide the output voltage VOUT. That is, low-pass filter 830 may filter harmonics having high frequency from the rectified voltage VRECT to provide the output voltage VOUT.

For example, when the level of the output voltage VOUT decreases, the level of the feedback voltage VFB2 also decreases and, thus, the level of the first error voltage VER1 increases. When the level of the first error voltage VER1 increases, the level of the second error voltage VER2 increases. When the level of the second error voltage VER2 increases, pulse width of the pulse signal SPW increases, and the first gate driver 813 turns-on the first NMOS transistor 821 during a time interval corresponding to increased pulse width of the pulse signal SPW. Therefore, the level of the output voltage VOUT increases.

For example, when the level of the output voltage VOUT increases, the level of the feedback voltage VFB2 also increases and, thus, the level of the first error voltage VER1 decreases. When the level of the first error voltage VER1 decreases, the level of the second error voltage VER2 decreases. When the level of the second error voltage VER2 decreases, pulse width of the pulse signal SPW decreases, and the first gate driver 813 turns-on the first NMOS transistor 821 during a time interval corresponding to decreased pulse width of the pulse signal SPW. Therefore, the level of the output voltage VOUT decreases. The voltage converter 800 coverts the rectified voltage VRECT to the output voltage with a high power transformation efficiency. The voltage converter 800 may be a buck converter.

Figure 23:
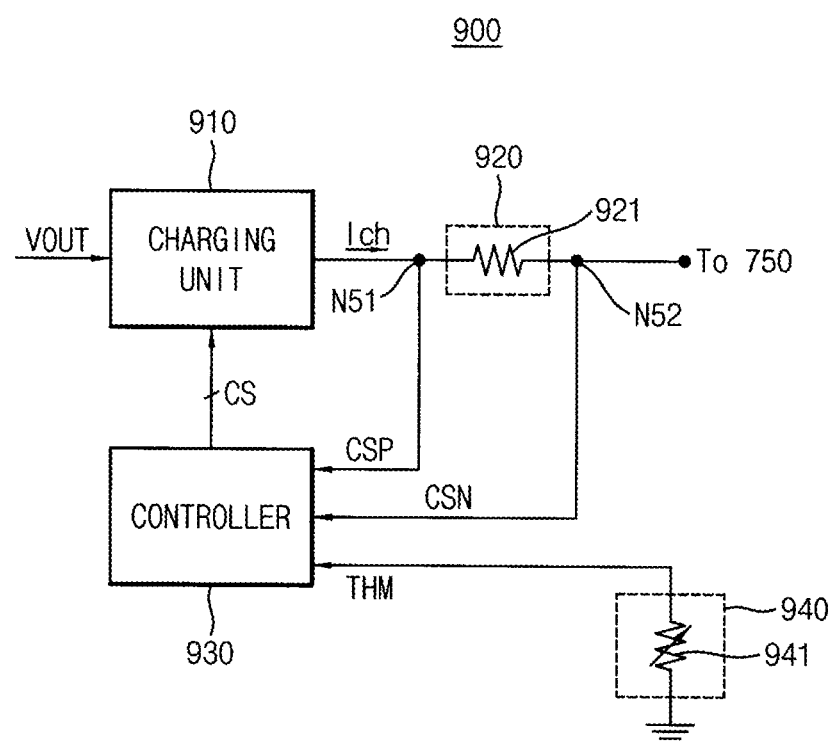
FIG. 23 is a block diagram illustrating the charging circuit of FIG. 21 according to some example embodiments.

FIG. 23 is a block diagram illustrating the charging circuit of FIG. 21 according to some example embodiments.

Referring to FIG. 23, the charging circuit 900 includes a charging unit 910, a sensing unit 920, a controller 930, and a temperature sensor 940. The sensing unit 920 may be implemented by a resistor 921, and the temperature sensor 940 may be implemented by a thermistor 941 that has a negative temperature coefficient.

The charging unit 910 receives the output voltage VOUT, generates a charging current Ich based on the output voltage VOUT, and provides the charging current Ich to the rechargeable battery 750. The sensing unit 920 may include the resistor 921, and the sensing unit 920 may be connected to first and second nodes N51 and N52 between the charging unit 910 and the rechargeable battery 750. The sensing unit 920 provides a first voltage signal CSP at the first node N51 and provides a second voltage signal CSN at the second node N52. The resistance of the resistor 921 is a desired value (that may or may not be predetermined), and a level of the charging current Ich may be calculated based on the resistance of the resistor 921 and the first and second voltage signals CSP and CSN (e.g., voltages at the two ends of the resistor 921).

The temperature sensor 940 is arranged close to the rechargeable battery 750, senses a temperature or an ambient temperature of the rechargeable battery 750, and provides a temperature signal THM to the controller 930. The temperature sensor 940 may include the thermistor 941 that has a negative temperature coefficient (NTC). The thermistor 941 is a resistor whose resistance varies according to a change in the temperature. The NTC thermistor has a resistance that decreases with an increase in temperature. However, the temperature sensor 940 is not limited to the NTC thermistor 941.

The controller 930 receives the first and second voltage signals CSP and CSN and the temperature signal THM, and calculates the level (or magnitude) of the charging current Ich based on the first and second voltage signals CSP and CSN. The second voltage signal CSN is a voltage applied to a positive electrode of the rechargeable battery 750. The second voltage signal CSN may indicate a battery voltage of the rechargeable battery 750. Therefore, the controller 930 may control the charging unit 910 according to a charging mode based on the first and second voltage signals CSP and CSN and the temperature signal THM such that a lithium plating phenomenon does not occur at a negative electrode of the rechargeable battery 750 due to the charging current Ich. That is, the controller 930 may control the charging unit 910 via control signal(s) CS according to a charging mode based on the first and second voltage signals CSP and CSN and the temperature signal THM such that a level of the charging current Ich is adjusted. Therefore, the charging circuit 900 may rapidly charge the rechargeable battery 750 while preventing the lithium plating phenomenon from occurring at a negative electrode of the rechargeable battery 750 by providing the rechargeable battery 750 with the charging current Ich following a current profile of FIG. 13 or FIG. 14.

Figure 24:
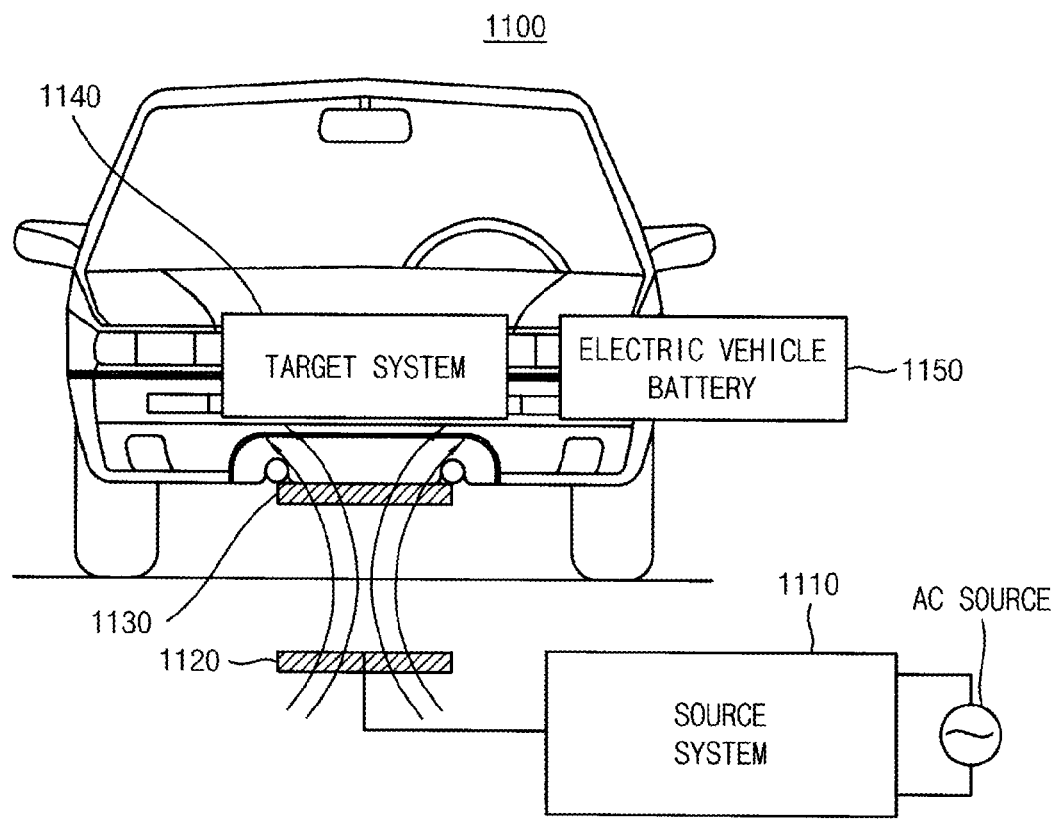
FIG. 24 illustrates an example of an electric vehicle charging system.

FIG. 24 illustrates an example of an electric vehicle charging system.

Referring to FIG. 24, an electric vehicle charging system 1100 includes a source system 1110, a source resonator 1120, a target resonator 1130, a target system 1140, and an electric vehicle battery 1150.

The electric vehicle charging system 1100 may have a similar structure to the wireless power transmission and charging system of FIG. 18. The source system 1110 and the source resonator 1120 in the electric vehicle charging system 1100 may function as a source using power supplied, for example, by AC source AC SOURCE. Additionally, the target resonator 1130 and the target system 1140 in the electric vehicle charging system 1100 may function as a target.

The source system 1110 may include a SMPS, a power detector, a power amplifier, a matching network, a TX control unit, and a communication unit, similarly to the source 605 of FIG. 19. The target system 1140 may include a matching network, a rectifier, a voltage converter, a charger, a battery, radio frequency (RF) blocks, digital blocks, and a RX control unit, similarly to the target 705 of FIG. 20.

The electric vehicle battery 1150 may be charged by the target system 1140.

The electric vehicle charging system 1100 may use a resonant frequency in a band of a few kilohertz (KHz) to tens of MHz.

The source system 1110 may generate power, based on a type of charging vehicle, a capacity of a battery, and a charging state of a battery, and may supply the generated power to the target system 1140.

The source system 1110 may control the source resonator 1120 and the target resonator 1130 to be aligned. For example, when the source resonator 1120 and the target resonator 1130 are not aligned, the control/communication unit of the source system 1110 may transmit a message to the target system 1140, and may control alignment between the source resonator 1120 and the target resonator 1130.

For example, when the target resonator 1130 is not located in a position enabling maximum magnetic resonance, the source resonator 1120 and the target resonator 1130 may not be aligned. When a vehicle does not stop accurately, the source system 1110 may induce a position of the vehicle to be adjusted, and may control the source resonator 1120 and the target resonator 1130 to be aligned.

The source system 1110 and the target system 1140 may transmit or receive an identification (ID) of a vehicle, and/or may exchange various messages, through communication.

The descriptions of FIGS. 18 through 23 may be applied to the electric vehicle charging system 1100. That is, the electric vehicle charging system 1100 may include the charging circuit 900 of FIG. 23, and the charging circuit 900 may rapidly charge the electric vehicle battery 1150 while preventing the lithium plating phenomenon from occurring at a negative electrode of the electric vehicle battery 1150 by providing the electric vehicle battery 1150 with the charging current Ich following a current profile of FIG. 13 or FIG. 14. However, the electric vehicle charging system 1100 may use a resonant frequency in a band of a few KHz to tens of MHz, and may transmit power that is equal to or higher than tens of watts to charge the electric vehicle battery 1150.

Figure 25:
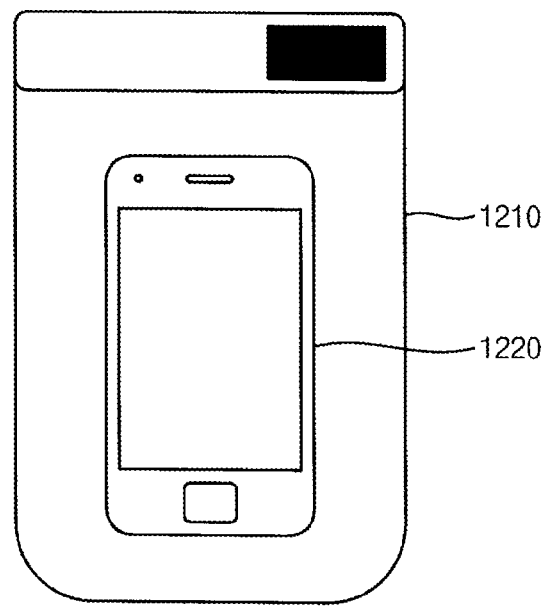
FIG. 25 illustrates an example of application in which a wireless power receiver and a wireless power transmitter may be mounted.

FIG. 25 illustrates an example of an application in which a wireless power receiver and a wireless power transmitter may be mounted.

FIG. 25 illustrates an example of a wireless power charging application 1200 including a pad 1210 and a mobile terminal 1220.

In some example embodiments, a wireless power transmission device (e.g., the source device 600) may be mounted in the pad 1210, and a wireless power reception device (e.g., the target device 700) may be mounted in the mobile terminal 1220. The pad 1210 may be used to charge a single mobile terminal, namely the mobile terminal 1220. The descriptions of FIGS. 18 through 23 may be applied to the pad 1210 and the mobile terminal 1220. A wireless power reception device in the mobile terminal 1220 includes a charging circuit, and the charging circuit may rapidly charge a rechargeable battery in the mobile terminal 1220 while preventing the lithium plating phenomenon from occurring at a negative electrode of the rechargeable battery by providing the rechargeable battery with the charging current Ich following a current profile of FIG. 13 or FIG. 14.

As mentioned above, a rechargeable battery is charged by providing the rechargeable battery with a charging current following a current profile of a constant power mode or a constant current mode at an initial charging stage, and adjusting the level of the charging current such that the lithium plating phenomenon does not occur at the negative electrode of the rechargeable battery. Therefore, the charging circuit may rapidly charge the rechargeable battery while preventing degradation of the lifespan of the rechargeable battery.

The above described example embodiments may be applied to various wired or wireless charging system. For example, the above described example embodiments may be applied to wired or wireless charging of a mobile terminal and a battery of electric vehicle, and the like.

While the inventive concepts have been described with reference to some example embodiments, it will be apparent to those skilled in the art that various changes and modifications may be made without departing from the spirit and scope of the present invention. Therefore, it should be understood that the above example embodiments are not limiting, but illustrative.

It should be understood that the example embodiments described herein should be considered in a descriptive sense only and not for purposes of limitation. Descriptions of features or aspects within each embodiment should typically be considered as available for other similar features or aspects in other embodiments.

What is claimed is:

1. A charging circuit, comprising:
   a battery unit in which a rechargeable battery is mounted;
   a charging unit configured to provide a charging current to the rechargeable battery in the battery unit, based on a direct current (DC) voltage converted from an alternating current (AC) voltage, and configured to charge the rechargeable battery; and
   a controller configured to control the charging unit such that the charging unit provides the rechargeable battery with a first charging current following a first current profile in a first charging mode as the charging current at least in a first period of the first charging mode, based on the charging current, a battery voltage of the rechargeable battery, and a temperature of the rechargeable battery, wherein the first current profile is smaller than an available maximum current in the first period, and the controller is further configured to control the charging unit such that either the charging current multiplied by the rechargeable battery voltage has a constant value in the first period of the first charging mode or the charging current has a constant value in the first period of the first charging mode.

2. The charging circuit of claim 1, wherein the first charging mode includes the first period and a second period successive to the first period, wherein the first and second periods are divided based on a comparison of magnitudes of the charging current and the available maximum current, and wherein the controller is further configured to control the charging unit such that the charging unit provides the rechargeable battery with a second charging current, which is smaller than the first current profile, as the charging current in the second period.

3. The charging circuit of claim 2, wherein a charging mode of the charging circuit transits from the first charging mode to a second charging mode after the second period ends, and wherein the second charging mode includes a third period, in which the charging unit provides the rechargeable battery with the second charging current, and a fourth period, in which the charging unit provides the rechargeable battery with a third charging current that follows a second current profile, which is smaller than the second charging current, as the charging current.

4. The charging circuit of claim 3, wherein the first current profile decreases with time.

5. The charging circuit of claim 3, wherein the controller is further configured to control the charging unit to have the battery voltage be a constant voltage value in the fourth period of the second charging mode.

6. The charging circuit of claim 1, further comprising:
a temperature sensor, connected to the battery unit, configured to sense the temperature of the rechargeable battery to provide a temperature signal.

7. The charging circuit of claim 6, wherein the temperature sensor is a thermistor that has a negative temperature coefficient.

8. The charging circuit of claim 1, wherein the rechargeable battery is a lithium ion secondary battery, and wherein the available maximum current is a maximum value of the charging current that prevents lithium plating at a negative electrode of the lithium ion secondary battery in the first charging mode.

9. The charging circuit of claim 1, wherein the controller is further configured to control the charging unit such that the charging unit provides the rechargeable battery with a preliminary charging current as the charging current, and wherein the preliminary charging current is smaller than the first charging current in a preliminary charging mode preceding the first charging mode.

10. The charging circuit of claim 1, wherein the first current profile does not increase with time.

11. A wireless power reception device, comprising:
a rechargeable battery;
a rectifier configured to rectify an input voltage to provide a rectified voltage, wherein the input voltage is generated based on energy in a target resonator through magnetic resonance from a source resonator;
a voltage converter configured to convert the rectified voltage to an output voltage; and
a charging circuit configured to receive the output voltage, and configured to provide a charging current to the rechargeable battery to charge the rechargeable battery;
wherein the charging circuit comprises:
a charging unit configured to provide the charging current to the rechargeable battery based on the output voltage; and
a controller configured to control the charging unit such that the charging unit provides the rechargeable battery with a first charging current following a first current profile in a first charging mode as the charging current at least in a first period of the first charging mode, based on the charging current, a battery voltage of the rechargeable battery, and a temperature of the rechargeable battery, wherein the first current profile is smaller than an available maximum current in the first period, and the controller is further configured to control the charging unit such that either the charging current multiplied by the rechargeable battery voltage has a constant value in the first period of the first charging mode or the charging current has a fixed value in the first period of the first charging mode.

12. The wireless power reception device of claim 11, wherein the target resonator is configured to receive the energy from the source resonator through electromagnetic induction.

13. The wireless power reception device of claim 11, wherein the target resonator is configured to receive the energy from the source resonator through electromagnetic resonance.

14. The wireless power reception device of claim 11, wherein the voltage converter is a buck converter.

15. A charging system, comprising:
a rechargeable battery;
a system load;
a charging circuit configured to receive direct current (DC) voltage, to provide charging current to the rechargeable battery, and to supply power to the system load; and
a switch configured to selectively connect the rechargeable battery to the system load according to a power demand of the system load;
wherein the charging circuit comprises
a charging unit configured to provide the charging current to the rechargeable battery based on the DC voltage; and
a controller configured to control the charging unit such that the charging current follows a first current profile in at least a first period of a first charging mode based on the charging current, a battery voltage of the rechargeable battery, and a temperature of the rechargeable battery, and the controller is further configured to control the charging unit such that either the charging current multiplied by the rechargeable battery voltage has a constant value in the first period of the first charging mode or the charging current has a fixed value in the first period of the first charging mode; and
wherein the first current profile is smaller than an available maximum current in the first period.

16. The charging system of claim 15, wherein the charging circuit is further configured to apply a signal to the switch such that the rechargeable battery is connected to the system load when the power demand of the system load is greater than an available power associated with the DC voltage.

17. The charging system of claim 15, wherein the charging circuit is further configured to apply a signal to the switch such that the rechargeable battery is not connected to the system load when the power demand of the system load is less than an available power associated with the DC voltage.

18. The charging system of claim 15, wherein the charging circuit further comprises:
   a temperature sensor configured to sense the temperature of the rechargeable battery.

19. The charging system of claim 18, wherein the temperature sensor is a thermistor.

20. The charging system of claim 18, wherein the temperature sensor has a negative temperature coefficient.

* * * * *